United States Patent [19]
Ichimoto et al.

[11] Patent Number: 5,909,723
[45] Date of Patent: Jun. 8, 1999

[54] APPARATUS AND A METHOD FOR CONTROLLING THE IGNITION TIMING OF A CYLINDER-INJECTION INTERNAL COMBUSTION ENGINE

[75] Inventors: Kazuhiro Ichimoto, Nagoya; Osamu Nakayama, Toyota; Mitsuru Kishimoto; Kazumasa Iida, both of Kyoto; Hiroki Tamura, Okazaki; Katsuhiko Miyamoto, Funai-gun; Hiromitsu Ando, Okazaki, all of Japan

[73] Assignee: Mitsubishi Jidosha Kogyo Kabushiki Kaisha, Tokyo, Japan

[21] Appl. No.: 08/966,705

[22] Filed: Nov. 10, 1997

Related U.S. Application Data

[63] Continuation of application No. 08/799,219, Feb. 14, 1997, abandoned.

[30] Foreign Application Priority Data

Feb. 16, 1996 [JP] Japan ................................. 8-029492
Jul. 23, 1996 [JP] Japan ................................. 8-193672

[51] Int. Cl.$^6$ ...................................................... F02P 5/15
[52] U.S. Cl. ........................................ 123/406; 123/406.55
[58] Field of Search .................................. 123/305, 421, 123/422, 425, 435

[56] References Cited

U.S. PATENT DOCUMENTS

| | | | |
|---|---|---|---|
| 4,424,783 | 1/1984 | Kotwicki | 123/421 X |
| 4,466,408 | 8/1984 | Cheklich | 123/425 |
| 4,480,620 | 11/1984 | Tange et al. | 123/478 |
| 5,150,300 | 9/1992 | Danno et al. | 123/425 |

FOREIGN PATENT DOCUMENTS 64-39478 3/1989 Japan .

*Primary Examiner*—Tony M. Argenbright

[57] ABSTRACT

An apparatus for controlling an ignition timing of a cylinder-injection gasoline engine includes an electronic control unit (ECU) for controlling the operation of an ignition coil. The ECU advances the ignition timing in accordance with the throttle opening in consideration of a delay in increase of the wall temperature of a combustion chamber when the acceleration of a vehicle is detected by the change of the throttle opening. In order to prevent knocking of the engine attributable to the increase of the wall temperature, the ECU gradually decreases an advance angle for the ignition timing to 0 with the passage of control time. When the engine is reaccelerated during the advance angle correction, the ECU newly sets an advance angle for the ignition timing and a control time, corresponding to the increase of the wall temperature.

33 Claims, 14 Drawing Sheets

APPARATUS AND A METHOD FOR CONTROLLING THE IGNITION TIMING OF A CYLINDER-INJECTION INTERNAL COMBUSTION ENGINE

This application is a continuation of application Ser. No. 08/799,219 filed on Feb. 14, 1997, now abandoned.

BACKGROUND OF THE INVENTION

1. Field of the Invention

The present invention relates to an apparatus and a method for controlling the ignition timing of a cylinder-injection and spark ignition type internal combustion engine to prevent the engine from knocking during its transient operation and ensure both improvement of the engine output and reduction of the fuel consumption.

2. Description of the Related Art

Internal combustion engines mounted in automobiles are expected to be designed so that they decrease harmful components in the exhaust gas therefrom and consume less fuel. Accordingly, there have recently been proposed cylinder-injection and spark ignition type internal combustion engines (the engine of this type is hereinafter referred to as DI engine) in which fuel is injected directly into their combustion chamber, in place of conventional spark ignition type internal combustion engines, i.e., conventional gasoline engines, in which fuel is injected into their intake port or intake manifold.

A DI engine is provided with a fuel injection valve for directly injecting the fuel into a combustion chamber thereof. More specifically, a cavity is formed on the top of a piston fitted in the cylinder, and the fuel injection valve directly injects the fuel into the combustion chamber or the cavity in a final stage of the compression stroke when the DI engine is in low-load operation. In the cavity, the injected fuel forms an air-fuel mixture with an air-fuel ratio near the theoretical air-fuel ratio around a spark plug. Even though the average air-fuel mixture in the entire combustion chamber is lean, therefore, the fuel can be securely ignited by the spark plug, since the air-fuel mixture around the spark plug has the air-fuel ratio near the theoretical air-fuel ratio. As a result, CO and HC contained in the exhaust gas from the DI engine are reduced, and the fuel consumption of the DI engine is lessened substantially during idle operation or low-load operation of the DI engine.

On the other hand, the fuel injection valve directly injects the fuel into the combustion chamber in an initial stage of the intake stroke during high-load operation of the DI engine. The injected fuel uniformly makes a stoichiometric or relatively rich air-fuel mixture in the combustion chamber so that the DI engine output is increased.

Unlike the conventional gasoline engines, the DI engine therefore is free from a delay in fuel transportation, since the fuel is injected directly into the cylinder or the combustion chamber, as described above. In a conventional gasoline engine, fuel is injected into its intake port or intake manifold, so that it is impossible to avoid the delay in fuel transportation, that is, a lag between the time of fuel injection and the time when the fuel is practically introduced into the combustion chamber. If the injection quantity of the fuel is increased or decreased in the DI engine, such increase or decrease is therefore reflected immediately in acceleration or deceleration of the DI engine, so that the engine response is substantially improved.

The output and fuel consumption of the conventional gasoline engine depend greatly on the ignition timing of the spark plug. In other words, the ignition timing is an important factor that determines the engine output and fuel consumption. More specifically, if an air-fuel mixture is burned under the same conditions except the ignition timing, the engine output or torque obtained by the combustion of the fuel is substantially influenced by the ignition timing. In this case, the ignition timing for making the conventional gasoline engine generate a maximum output thereof exists before the top dead center of the piston, and the advance of the ignition timing is referred to as MBT (minimum spark advance for the best torque). If the advance of the ignition timing is increased or decreased from the MBT, the combustion pressure in the cylinder cannot be utilized effectively. Thus, the engine output decreases, while the fuel consumption increases.

Even though the advance of the ignition timing is set to the MBT, however, the conventional gasoline engine may knock due to the octane value of the fuel, engine loads, etc. In most operation regions of the conventional gasoline engine, therefore, the ignition timing is generally adjusted to a basic ignition timing that is reduced or retarded by a given margin compared to the MBT.

When the conventional gasoline engine is in a stable operation region, the basic ignition timing is normally set according to a map based on the engine speed, loads, etc. as parameters. When the conventional gasoline engine is in a transient operation region, however, the ignition timing is controlled so as to be further retarded or advanced compared to the basic ignition timing obtained from the map. Disclosed in Jpn. Pat. Appln. KOKAI Publication No. 2-223647, for example, teaches a technique for temporarily retarding the ignition timing behind the basic ignition timing and then advancing it ahead of the basic ignition timing for a given period. By this technique, a conventional gasoline engine can be prevented from knocking, and its output can be improved. More specifically, when accelerative operation of the conventional gasoline engine is started, the injection quantity of the fuel is increased, whereupon the quantity of the fuel that adheres to the inner wall surface of the intake port or the intake manifold of the conventional gasoline engine also increases. Immediately after fuel injection, therefore, low-octane or high-volatility components of the fuel are introduced more than high-octane components of the fuel into the combustion chamber. If the ignition timing is retarded behind the basic ignition timing at this point of time, however, the conventional gasoline engine can be prevented from knocking. On the other hand, the wall temperature of the combustion chamber never rises suddenly when the ignition timing is retarded behind the basic ignition timing. If the ignition timing is advanced toward the MBT after the start of the engine acceleration, therefore, the engine output can be improved without causing the conventional gasoline engine to knock.

In the DI engine, the fuel is directly injected into the cylinder or the combustion chamber, so that there is no possibility of more low-octane components than high-octane components flowing into the combustion chamber. If the aforementioned ignition timing control for the conventional gasoline engine is applied to the DI engine, therefore, the engine output is unfavorably lowered owing to the retard of the ignition timing, and besides, the fuel consumption inevitably increases when the accelerative operation of the engine is started.

SUMMARY OF THE INVENTION

The object of the present invention is to provide an apparatus and a method for optimally controlling the ignition timing of a cylinder-injection and spark ignition type internal combustion engine, that is, a DI engine, to prevent the DI engine from knocking and improve the engine output during transient operation of the DI engine.

The above object is achieved by the present invention, which is adapted to a cylinder-injection internal combustion engine. An apparatus for carrying out a method for controlling the ignition timing of the engine according to the present invention comprises: discriminating means for discriminating an operation state of the engine; determining means for determining the ignition timing for an ignition device of the engine in accordance with at least a load on the engine and the engine speed; detecting means for detecting a wall temperature variable corresponding to one of a wall temperature of a combustion chamber of the engine and a parameter related to the wall temperature; and correcting means for correcting the ignition timing on an advance side in accordance with the wall temperature variable for a given period of time from a start of accelerative operation of the engine when it is concluded by the discriminating means that the engine operation state has changed to an accelerative operation state.

According to the apparatus and method described above, when the engine operation state proceeds to an accelerative operation state, the ignition timing is corrected on an advance side in response to a change of the wall temperature variable, that is, a delay in rise of the wall temperature of the combustion chamber of the engine, for a given period after the start of the accelerative operation. Thus, the wall temperature is relatively low at the initial stage of the accelerative operation of the engine. Even though the ignition timing is advanced, therefore, the engine output can be increased without causing the engine to knock, and the acceleration performance of the engine can be improved. Since the combustion energy of the fuel can be utilized effectively, moreover, the fuel consumption can be reduced.

Preferably, the apparatus for carrying out the control method of the invention can restrain or suspend the correction of the ignition timing on the advance side when an engine operation state immediately before the transfer to the accelerative operation state is a high-load operation state. The wall temperature is already relatively high when the engine operation state proceeds from the high-load operation state to the accelerative operation state. If the ignition timing is advanced in this situation, therefore, the engine is liable to knock. When the advance of the ignition timing is restrained or suspended in this case, however, the engine is prevented from knocking.

It is concluded that the engine operation state has changed to an accelerative operation state when an output control member of the engine is actuated on the acceleration side at a speed equal or higher than a predetermined speed and an operation state of the engine, determined depending on the engine load and speed, represents a given acceleration region of the engine. In this case, the change of the engine operation state to the accelerative operation state can be discriminated accurately.

More specifically, the determining means can determine a basic ignition timing which is suited for a steady operation state of the engine. In this case, the correcting means may include storage means for storing at least one advance-side correction value in accordance with at least the load condition of the engine, and modifying means for modifying the at least one advance-side correction value, depending on the detected wall temperature variable. When the engine operation state proceeds to the accelerative operation state, therefore, the at least one advance-side correction value for the basic ignition timing is first read from the storage means in accordance with the engine load condition at the start of the accelerative operation. The read correction value is modified by the modifying means in accordance with the wall temperature variable. As a result, an actual ignition timing is obtained by correcting the basic ignition timing on the advance side in accordance with the modified correction value.

Further, the correcting means can suspend the correction of the basic ignition timing when the engine load condition is changed during the correction. Thereafter, the correcting means sets a new correction value for the basic ignition timing in accordance with the latest engine load condition after the change, and corrects the basic ignition timing on the advance side in accordance with the newly set correction value. If the engine load changes as the engine is, for example, reaccelerated during the correction of the basic ignition timing, in this case, the new advance-side correction value is set corresponding to the change, and the basic ignition timing is corrected in accordance with this new correction value. Even though the wall temperature of the combustion chamber changes as the engine is reaccelerated, therefore, the actual ignition timing is properly advanced following the temperature change.

In determining the ignition timing, on the other hand, an optimum ignition timing for obtaining a maximum engine output can be set in accordance with at least the engine load and speed. In this case, the optimum ignition timing is corrected on the advance side in the state where the load of the engine is not lower than a predetermined load and the detected wall temperature variable is lower than a steady wall temperature variable. The steady wall temperature is obtained steadily when the load of the engine is not lower than the predetermined load. Thus, if the optimum ignition timing is corrected on the advance side when the wall temperature of the combustion chamber is lower than the steady wall temperature, more specifically, when the wall temperature is relatively low at the initial stage of the accelerative operation, the engine can enjoy an increased output without being caused to knock, so that the acceleration performance of the engine is improved. In consequence, the combustion energy of the fuel can be utilized effectively, so that the fuel consumption can be reduced.

Preferably, the advance-side correction of the optimum ignition timing is executed when the engine is in a specific high-load operation region after having changed to an accelerative operation state. Accordingly, the optimum ignition timing is advanced when the engine is accelerated in the high-load operation region, so that it can fully display its acceleration performance that is required in the high-load operation region.

The wall temperature variable can be estimated in accordance with detected values of the manipulated variable of an output control member of the engine and the engine speed. Also, the wall temperature variable can be estimated in accordance with the temperature of cooling water of the engine detected when the engine is started.

In the case where the operation state of the engine is divided into a plurality of operation regions in accordance with the engine speed and load, on the other hand, the discriminating means can select at least one of the operation regions, as a current engine operation state, in accordance with the current engine speed and load. In this case, the wall temperature variable is detected as a period of duration in which the engine is kept in the selected operation region, and the ignition timing is corrected on the advance side in accordance with the detected period of duration. Preferably, the selected operation region includes a specific high-load engine operation region. More specifically, if the selected operation region is the high-load operation region, that is, when the wall temperature of the combustion chamber is increasing, the advance of the ignition timing is reduced depending on the period of duration in which the engine is in the high-load operation region. Immediately after the change of the engine to the high-load operation region, therefore, the ignition timing is advanced substantially, so that the engine output can be increased. Since the advance of the ignition timing is reduced, thereafter, in proportion to the increase of the wall temperature of the combustion chamber, the engine can be effectively prevented from knocking.

In this case, moreover, the correcting means includes storage means for storing at least one advance-side correction value for the ignition timing set in accordance with at least the load condition of the engine, and learning means for setting a learning correction value for the advance-side correction angle in accordance with the detected period of duration. The learning correction value serves to determine a degree of reflection of the advance-side correction value on the ignition timing. The ignition timing is corrected on the advance side in accordance with the advance-side correction value read from the storage means and the set learning correction value. Thus, the ignition timing is corrected in consideration of the engine load condition, as well as the wall temperature of the combustion chamber, and the advance of the ignition timing can be subjected to optimum learning control.

More specifically, if the selected operation region is the high-load engine operation region, the learning means can change the learning correction value at a predetermined decreasing speed in a direction such that the degree of reflection of the learning correction value is decreased. When the engine is in any other region than the high-load operation region, on the other hand, the learning means can change the learning correction value at a predetermined increasing speed in a direction such that the degree of reflection of the learning correction value is increased.

Preferably, the decreasing speed of the learning correction value is higher than the increasing speed of the learning correction value. In this case, knocking of the engine can be effectively prevented without lowering the acceleration performance of the engine when the engine is in the high-load operation region.

The detecting means may directly detect the wall temperature of the combustion chamber as the wall temperature variable. In this case, the change of the wall temperature of the combustion chamber can be detected more accurately.

Another ignition timing control apparatus of the present invention comprises: setting means for setting an optimum ignition timing corresponding to a steady wall temperature of the combustion chamber, the steady wall temperature being obtained steadily for each of predetermined engine load conditions; discriminating means for discriminating a load condition of the engine; and correcting means for correcting the optimum ignition timing on the advance side for a given period of time when a sudden increase of the engine load is discriminated by the discriminating means.

When the engine operation state proceeds a transient engine operation, the rise of the wall temperature of the combustion chamber delays behind the sudden change of the engine load. In this situation, therefore, the optimum ignition timing is advanced for the given period, whereby the engine output is increased, and the acceleration performance of the engine is further improved.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENTS

Figure 1:
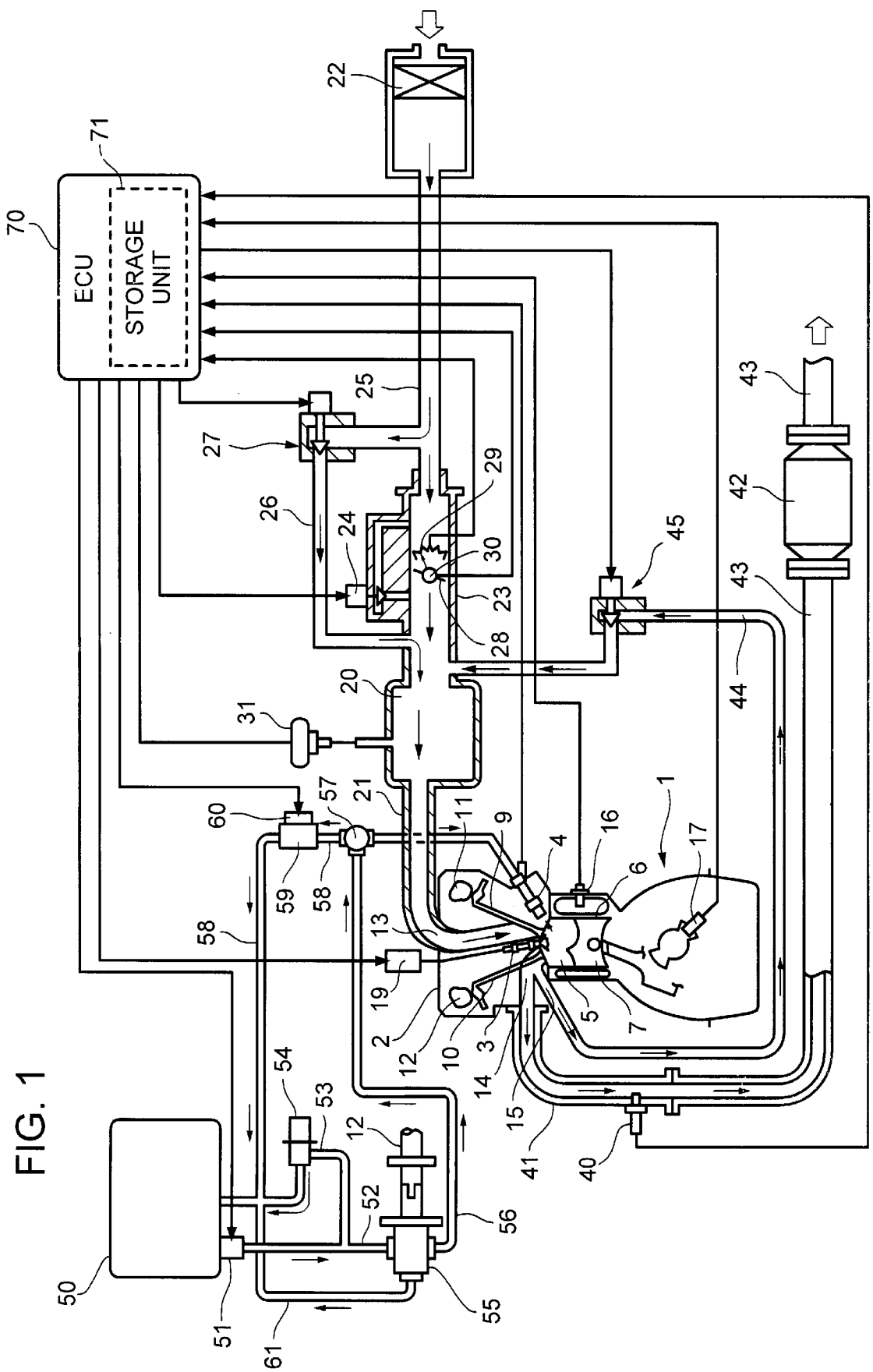
FIG. 1 is a schematic view showing a control system including a DI engine.

Referring to FIG. 1, there is shown an engine control system, which comprises a straight-type cylinder-injection four-cylindered gasoline engine (hereinafter referred to simply as engine) 1 for automobile. Combustion chambers, intake systems, EGR devices, etc. of the engine 1 are designed exclusively for cylinder injection. The engine 1 has a cylinder head 2, which is fitted with a spark plug 3 and a solenoid-operated fuel injection valve 4 for each cylinder 6. Each fuel injection valve 4 can inject fuel directly into its corresponding combustion chamber 5. The spark plug 3 is supplied with high voltage from an ignition coil 19.

Figure 2:
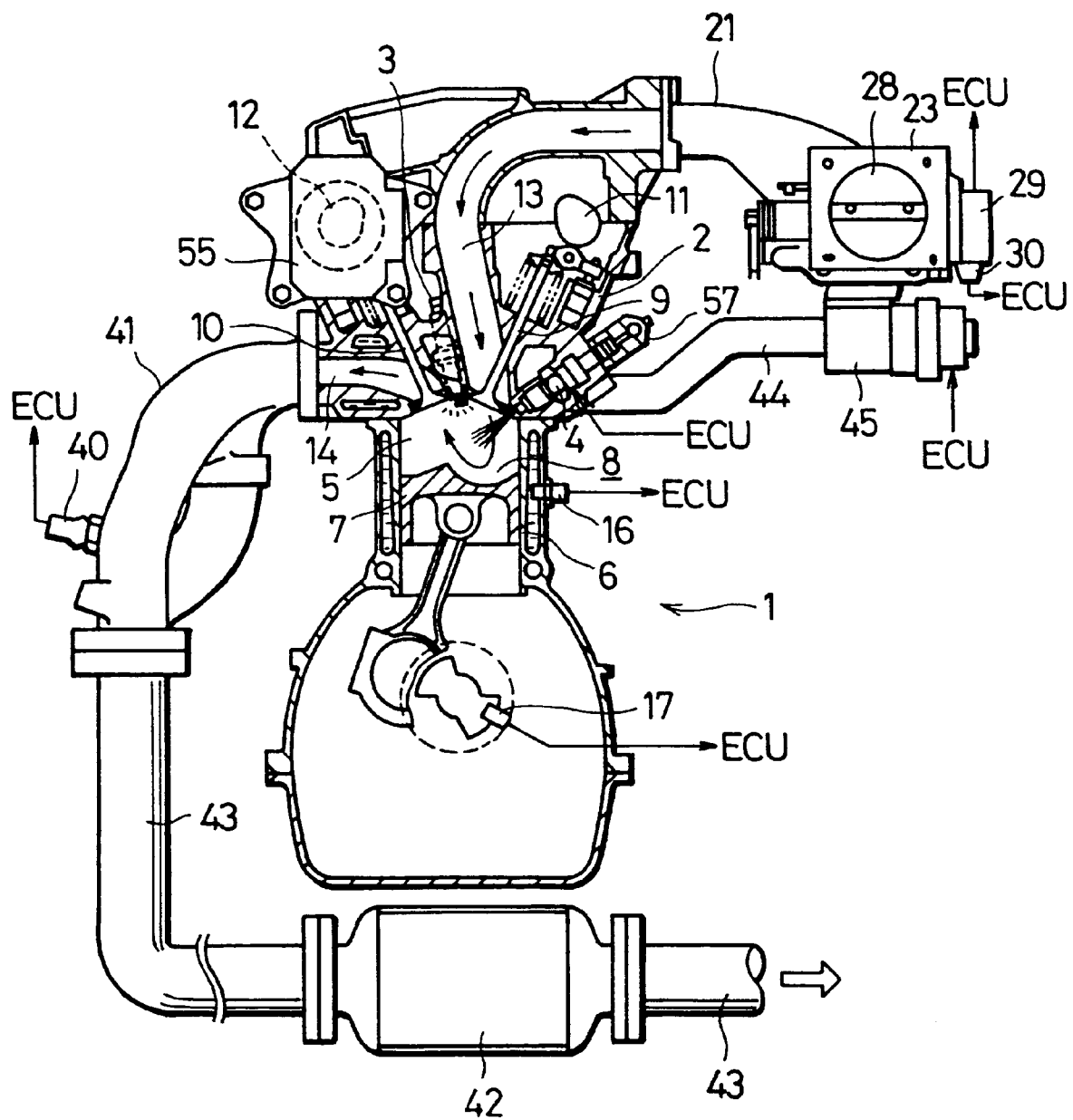
FIG. 2 is an enlarged view of the DI engine shown in FIG. 1.

As shown in FIG. 2, a piston 7 is slidably fitted in each cylinder 6, and a hemispherical cavity 8 is formed in the top face of the piston 7. The cavity 8 can receive a fuel spray from the fuel injection valve 4 when the piston 7 is in a latter half of the compression stroke. The theoretical compression ratio of the engine 1 is set at a higher value (e.g., about 12) than that of a conventional gasoline engine. A valve driving mechanism of a DOHC four-valve type is used for the engine 1. Thus, an intake-side camshaft 11 and an exhaust-side camshaft 12 are rotatably arranged in the upper portion of the cylinder head 2. As these camshafts 11 and 12 rotate, a pair of intake valves 9 and a pair of exhaust valves 10 are actuated individually. The rotating speed of the camshafts 11 and 12 is half that of the crankshaft of the engine 1.

An intake port 13 is formed for each intake valve in the cylinder head 2, extending substantially vertically between the camshafts 11 and 12. Air introduced through the intake ports 13 into the combustion chamber 5 forms reverse tumbling flows in the combustion chamber 5, which will be mentioned later.

Exhaust ports 14, like that of the conventional gasoline engine, substantially extend horizontally in the cylinder head 2. EGR ports 15 (shown only in FIG. 1) diverge from each of exhaust ports 14, and extend diagonally downward, respectively.

The cylinder block of the engine 1 has a water jacket, and is fitted with a water temperature sensor 16. The water temperature sensor 16 detects a water temperature $T_W$ of cooling water in the water jacket. Also, the engine 1 is furnished with a vane-type crank angle sensor 17, which outputs a crank angle signal SGT every time the crank angle of each cylinder 6 reaches a predetermined value (e.g., 5° BTDC and 75° BTDC). One of the camshafts 11 and 12 is fitted with a cylinder sensor (not shown), which periodically outputs a cylinder discrimination signal SGC as the camshaft rotates. Thus, one cylinder 6 of which the crank angle is indicated by the crank angle signal SGT delivered from the crank angle sensor 17 can be identified by the cylinder discrimination signal SGC from among the cylinders 6.

The intake ports 13 are connected to an intake manifold 21, which has a surge tank 20. From the surge tank 20 extends an intake pipe 25, which has an air cleaner 22 on its extreme end. A throttle body 23, which includes an ISC (idle speed control) valve 24 of a stepper-motor type, is inserted in the middle of the intake pipe 25.

Further, the intake pipe 25 is fitted with an air bypass pipe 26 that make a detour to avoid the throttle body 23, and the bypass pipe 26 is fitted with an ABV (air bypass valve) 27 of a linear-solenold type. The bypass pipe 26 has a flow sectional area substantially equal to that of the intake pipe 25. If the ABV 27 is nearly fully opened, therefore, a required quantity of intake air for the engine 1 can be supplied to the surge tank 20 through the air bypass pipe 26 when the engine operation is in a low- or medium-speed zone.

The throttle body 23 is provided with a butterfly—type throttle valve 28 for opening and closing an internal passage therein, a throttle sensor 29 for detecting an opening $\theta_{TH}$ of the throttle valve 28, and an idle switch 30 for detecting a fully-closed state of the throttle valve 28.

Further, the surge tank 20 is connected with a boost-pressure sensor or MAP (manifold absolute pressure) sensor 31, which detects a suction pressure Pb in the intake pipe 25.

On the other hand, the exhaust ports 14 are connected to an exhaust manifold 41, from which an exhaust pipe 43 extends. A muffler (not shown) is attached to the extreme end of the exhaust pipe 43. The exhaust manifold 41 is fitted with an $O_2$ sensor 40, and the exhaust pipe 43 is provided with a three-way catalyst 42.

Further, an EGR pipe 44 extends from the aforesaid EGR ports 15, and is connected to the upstream end portion of the surge tank 20. An EGR valve 45 of a stepper-motor type is inserted in the EGR pipe 44.

A fuel tank 50 is arranged in the rear portion of a vehicle body (not shown). The fuel tank 50 is furnished with a motor-operated low-pressure fuel pump 51, which sucks up the fuel stored in the fuel tank 50, and delivers it to a high-pressure fuel pump 55 on the engine side through a low-pressure feed pipe 52. A return pipe 53 extends from the feed pipe 52, and is connected to the fuel tank 50. A first fuel pressure regulator 54 is inserted in the return pipe 53, and serves to adjust the fuel pressure in the low-pressure feed pipe 52 to a relatively low pressure (hereinafter referred to as low fuel pressure).

The high-pressure fuel pump 55, which is attached to the cylinder head 2, delivers the fuel sucked in through the low-pressure feed pipe 52 into each fuel injection valve 4 through a high-pressure feed pipe 56 and a delivery pipe 57. The high-pressure fuel pump 55 is of a swash-plate axial-piston type, and is driven by the exhaust-side camshaft 12. The pressure of the fuel delivered from the high-pressure fuel pump 55 ranges from 50 to 60 kg/mm$^2$ or more even when the engine 1 is in idle operation.

A return pipe 58 extends from the delivery pipe 57, and is also connected to fuel tank 50. A second fuel pressure regulator 59 is inserted in the return pipe 58, and serves to adjust the fuel pressure in the delivery pipe 57 to a relatively high pressure (hereinafter referred to as high fuel pressure). The second fuel pressure regulator 59 is provided with a solenoid-operated selector valve 60. The selector valve 60 allows the fuel in the delivery pipe 57 to get into the fuel tank 50, thereby lowering the fuel pressure in the delivery pipe 57 to the level of the low fuel pressure when the selector valve is opened.

Further, a return pipe 61 extends from the high-pressure fuel pump 55. The fuel is returned to the fuel tank 50 through the return pipe 61 after the fuel is used to lubricate or cool the high-pressure fuel pump 55.

An electronic control unit (ECU) 70 is arranged in a cabin of the automobile. The ECU 70 is furnished with a microprocessor, timer counter, input interface, output interface, and storage unit 71. The storage unit 71 includes a ROM, RAM, BURAM, etc., and is previously stored with control programs, control maps, etc. The input interface of the ECU 70 is supplied with information data detected by the aforesaid various sensors. Based on the input information data, the ECU 70 determines a fuel injection mode, injection quantity of the fuel, ignition timing, EGR gas introduction rate, etc., and controls the operation of the fuel injection valve 4, ignition coil 19, EGR valve 45, etc. by the medium of the output interface. The input interface of the ECU 70 is also connected with a large number of switches (not shown), while the output interface is connected with various warning lamps and other devices (not shown).

The following is a description of an outline of engine control.

Outline of Engine Control

When a vehicle driver turns on a ignition key of the automobile, the ECU 70 actuates the low-pressure fuel pump 51, and then switches on the selector valve 60 on the condition that the engine 1 is cold. In this case, the fuel injection valve 4 is supplied with the fuel at low fuel pressure. When the engine 1 is in a non-operating state, the high-pressure fuel pump 55 does not operate. When the engine 1 is being cranked, the operation of the high-pressure fuel pump 55 is unstable. In starting the engine 1, therefore, the quantity of the fuel to be injected from the injection valve 4 must be determined in accordance with the delivery pressure of the low-pressure fuel pump 51 and the valve-opening time of the fuel injection valve 4.

When the driver then turns the ignition key to a start position, the engine 1 is cranked by a self starter (not shown). At the same time, the ECU 70 initiates fuel injection control. At this point of time, the ECU 70 selects an early injection mode (mode in which the fuel is injected in the intake stroke) as the fuel injection mode. In this case, the ECU 70 controls the injection quantity of the fuel such that the average air-fuel mixture in the cylinder 6 or the combustion chamber 5 is relatively rich. The vaporization rate of the fuel is low when the engine 1 is cold. However, the fuel injected in the cylinder 6 is sufficiently vaporized since time required for vaporization of the fuel is ensured. On the other hand, if the fuel is injected in a late injection mode (mode in which the fuel is injected in the compression stroke), misfires and discharge of unburned fuel (HC) are unavoidable.

When the engine 1 is started, moreover, the ABV 27 is closed by the ECU 70, and the intake air is fed into the combustion chamber 5 through the ISC valve 24 and a gap between the throttle body 23 and the throttle valve 28. The ECU 70 manages the operations of the ISC valve 24 and the ABV 27, and controls the respective openings of the ISC valve 24 and the ABV 27 in accordance with a required quantity of the intake air which bypasses the throttle valve 28.

When the engine 1 proceeds to an idle operation after its starting is completed, the high-pressure fuel pump 55 operates with stability, and delivers the fuel at high fuel pressure. At this point of time, the ECU 70 switches off the selector valve 60, and the high-pressure fuel is supplied to the fuel injection valve 4. Thereafter, the injection quantity of the fuel is determined in accordance with the delivery pressure of the high-pressure fuel pump 55 and the valve-opening time of the fuel injection valve 4.

Until the cooling water temperature $T_W$ of the engine 1 reaches a predetermined value, the ECU 70 selects the early injection mode as the injection mode, as in the case of the starting, and the fuel is injected in this early injection mode. In this state, the ABV 27 is kept closed. If the engine loads increase or decrease depending on the operations of auxiliaries including an air conditioner, the ECU 70 controls the opening of the ISC valve 24, thereby keeping the idle speed of the engine 1 at a required rotational speed, as in the case of the conventional gasoline engine.

When the $O_2$ sensor 40 is activated after the passage of a predetermined period of time, thereafter, the ECU 70 starts air-fuel ratio feedback control in accordance with the output voltage of the $O_2$ sensor 40. Thereupon, harmful components contained in exhaust gas from the engine 1 are effectively removed by means of the three-way catalyst 42. When the engine 1 is cold, the aforesaid fuel injection control is carried out in the same manner as in the case of the conventional gasoline engine. In the case of the engine 1, however, no drops of the injected fuel adhere to the wall surface of the intake port 13, so that the response and accuracy of the fuel injection control are higher than those of the conventional gasoline engine.

Figure 3:
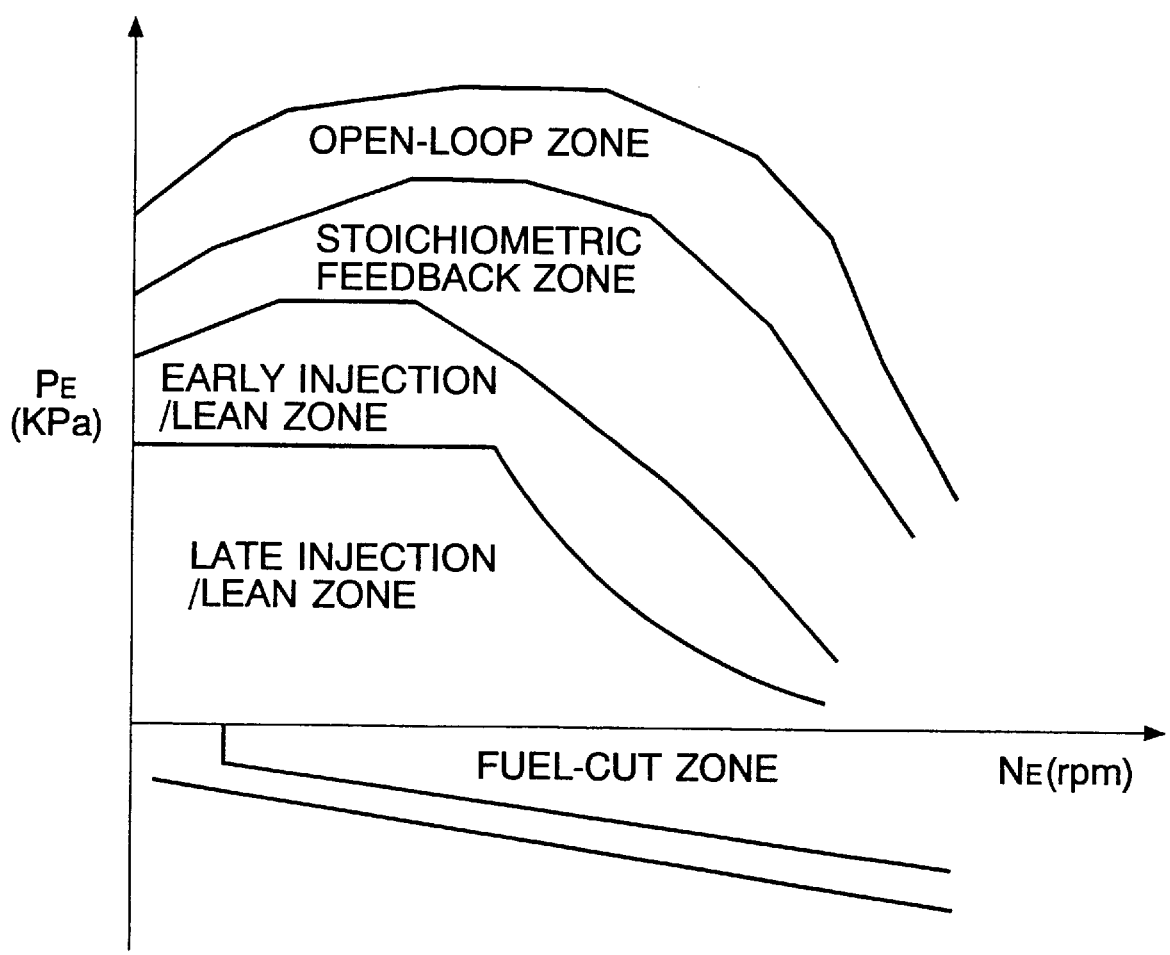
FIG. 3 is a map illustrating fuel injection control.

When warm-up operation of the engine 1 is finished, the ECU 70 selects a control zone for the present fuel injection from the control map of FIG. 3 in accordance with a target average effective pressure $P_E$ and an engine speed $N_E$. The ECU 70 obtains the target average effective pressure $P_E$ from the intake pressure Pb, throttle opening $\theta_{TH}$, etc. When the control zone is selected, the ECU 70 determines the fuel injection mode, injection quantity of the fuel, and injection timing, actuates the fuel injection valve 4 under these determined conditions, and at the same time, controls the open-close operations of the ABV 27 and the EGR valve 45. It is to be understood that the injection quantity of the fuel is proportional to the valve-opening time of the fuel injection valve 4.

When the engine 1 is in idle operation or in a low-load operation zone (for the vehicle's low-speed running), the ECU 70 selects a late injection/lean zone of FIG. 3 as the control zone. In this late injection/lean zone, the fuel is injected in the late injection mode, and the injection quantity of the fuel is controlled so that the air-fuel mixture in the combustion chamber 5 is lean (about 30 to 40 in terms of the average air-fuel ratio) as a whole. At this time, the ABV 27 is opened by the ECU 70.

In the late injection mode, the fuel is injected toward the cavity 8 of the piston 7 in its ascending stroke. Accordingly, this fuel injection, in cooperation with the cavity 8, causes the intake air in the cylinder 6 to form reverse tumbling flows 80, as indicated by arrows in FIG. 4, and a fuel spray 81 from the fuel injection valve 4 is stays in the cavity 8. Even though the average air-fuel mixture is lean, an air-fuel mixture having an air-fuel ratio near the theoretical air-fuel ratio stratifies around the spark plug 3 at the time of ignition. As a result, the air-fuel mixture can be ignited even though it is lean as a whole. Thus, CO and HC in the exhaust gas, as well as the fuel consumption, can be reduced considerably.

In the selected control zone, moreover, the ECU 70 allows to the EGR valve 45 to open, so that plenty of exhaust gas is introduced into the surge tank 20. Accordingly, the intake air to be fed into the combustion chamber 5 contains the exhaust gas at, e.g., 30% or more, so that $NO_x$ in the exhaust gas can be also reduced considerably.

When the engine 1 is in a medium-load operation zone (for the vehicle's constant speed running), the ECU 70 selects an early injection/lean zone or stoichiometric feedback zone of FIG. 3 as the control zone. In the early injection/lean zone, the fuel is injected in the early injection mode, and the injection quantity of the fuel is controlled such that the air-fuel mixture in the cylinder 6 is relatively lean (about 20 to 23 in terms of the average air-fuel ratio) as a whole. At this time, the ECU 70 keeps the EGR valve 45 closed.

Figure 5:
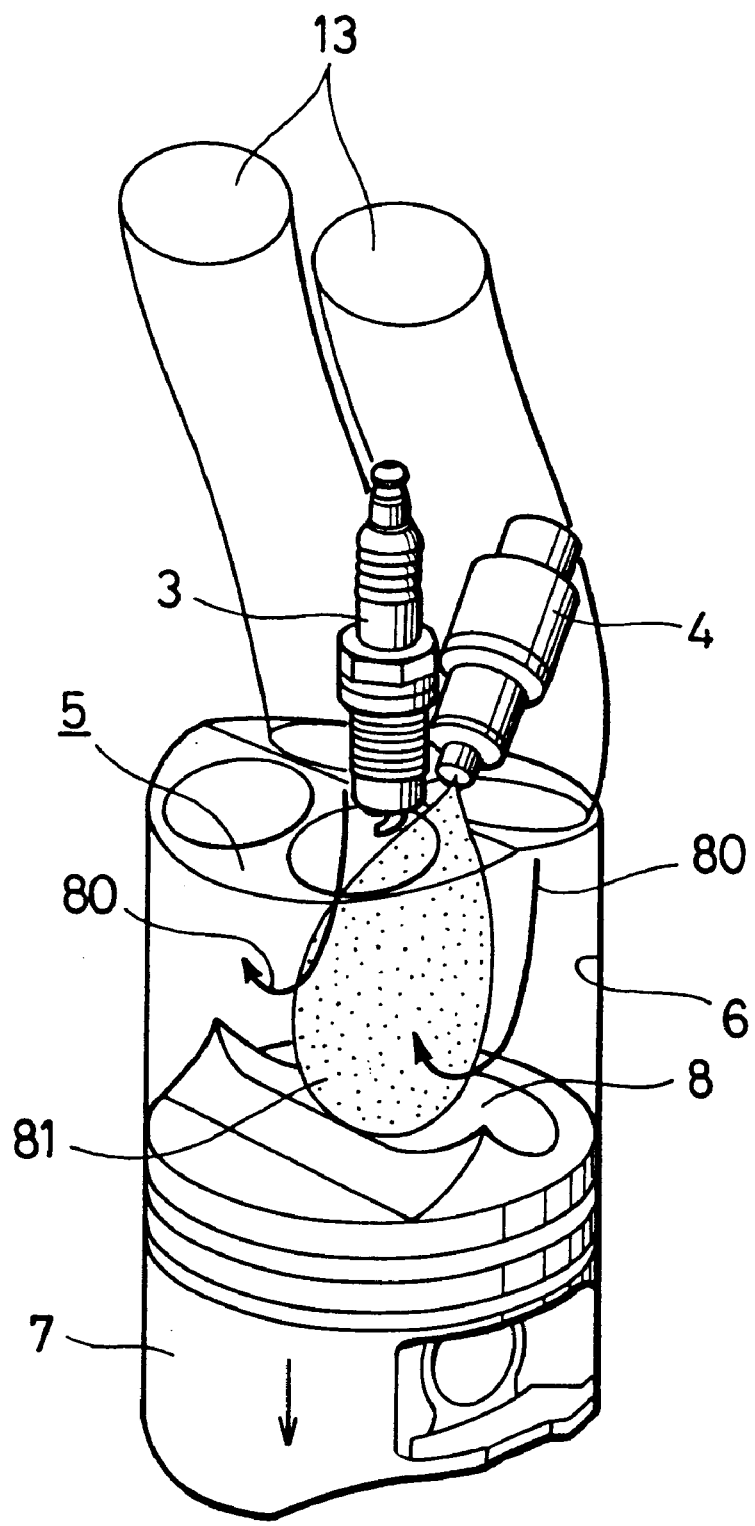
FIG. 5 is a view illustrating the way of fuel injection in an early injection mode.

More specifically, in the early injection/lean zone, the intake air introduced through the intake ports 13 forms reverse tumbling flows 80 while the piston 7 descends, as shown in FIG. 5. The reverse tumbling flows 80 are collapsed by ascending the piston 7 within a period which starts the latter stage of the next compression stroke and terminates the last stage thereof, so that the fuel spray 81 from the fuel injection valve 4 is uniformly mixed with the intake air in the combustion chamber 5 by the turbulence of the reverse tumbling flows 81. As a result, even though the air-fuel mixture is relatively lean as a whole, the air-fuel mixture can be ignited.

In the stoichiometric feedback zone, the fuel is injected in the early injection mode, and the injection quantity of the fuel is controlled such that the air-fuel ratio of the air-fuel mixture in the cylinder 6 is adjusted to the theoretical air-fuel ratio as a whole. In this case, ECU 70 controls the opening of the ABV 27 in accordance with the required quantity of intake air for the engine 1, and carries out feedback control of the air-fuel ratio according to the output voltage of the $O_2$ sensor 40. In this case, the ECU 70 allows the EGR valve 45 to open. Accordingly, the intake air to be fed into the combustion chamber 5 contains the exhaust gas in a suitable quantity, so that $NO_x$ in the exhaust gas is reduced effectively. Also, harmful components in the exhaust gas are removed by means of the three-way catalyst 42. Since the compression ratio of the engine 1 is relatively high, as mentioned before, moreover, the engine 1 generates a high output.

When the engine 1 is in a high-load operation zone (for the vehicle's rapid acceleration or high-speed running), the ECU 70 selects an open-loop control zone of FIG. 3 as the control zone. In this open-loop control zone, the ECU 70 injects the fuel in the early injection mode, and the injection quantity of the fuel is controlled in accordance with the throttle opening $\theta_{TH}$, engine speed $N_E$, etc. so that the air-fuel mixture is relatively rich as a whole. At this time, the ECU 70 keeps both the ABV 27 and the EGR valve 45 closed. In this case, since the compression ratio of the engine 1 is high, and the reverse tumbling flows 81 are formed in the cylinder 6, the engine 1 generates a high output. Besides, the intake ports 13 extend substantially vertical from the combustion chamber 5, as mentioned before, so that the intake air charging efficiency can be improved by the effect of inertia of the intake air to increase the engine output.

When the engine 1 is in an inertial operation zone (for the vehicle's medium- or high-speed running), the ECU 70 selects a fuel-cut zone of FIG. 3 as the control zone. In this case, the engine 1 stops the fuel injection. Thereupon, the fuel consumption is reduced, and the exhaust gas contains no harmful components at all. If the engine speed $N_E$ falls below a return speed or if the driver steps on the accelerator pedal, the ECU 70 immediately suspends fuel-cut operation, whereupon the fuel injection is resumed in the early or late injection mode.

The aforementioned outline of the engine control is executed according to a main routine (not shown) by the ECU 70.

Figure 9:
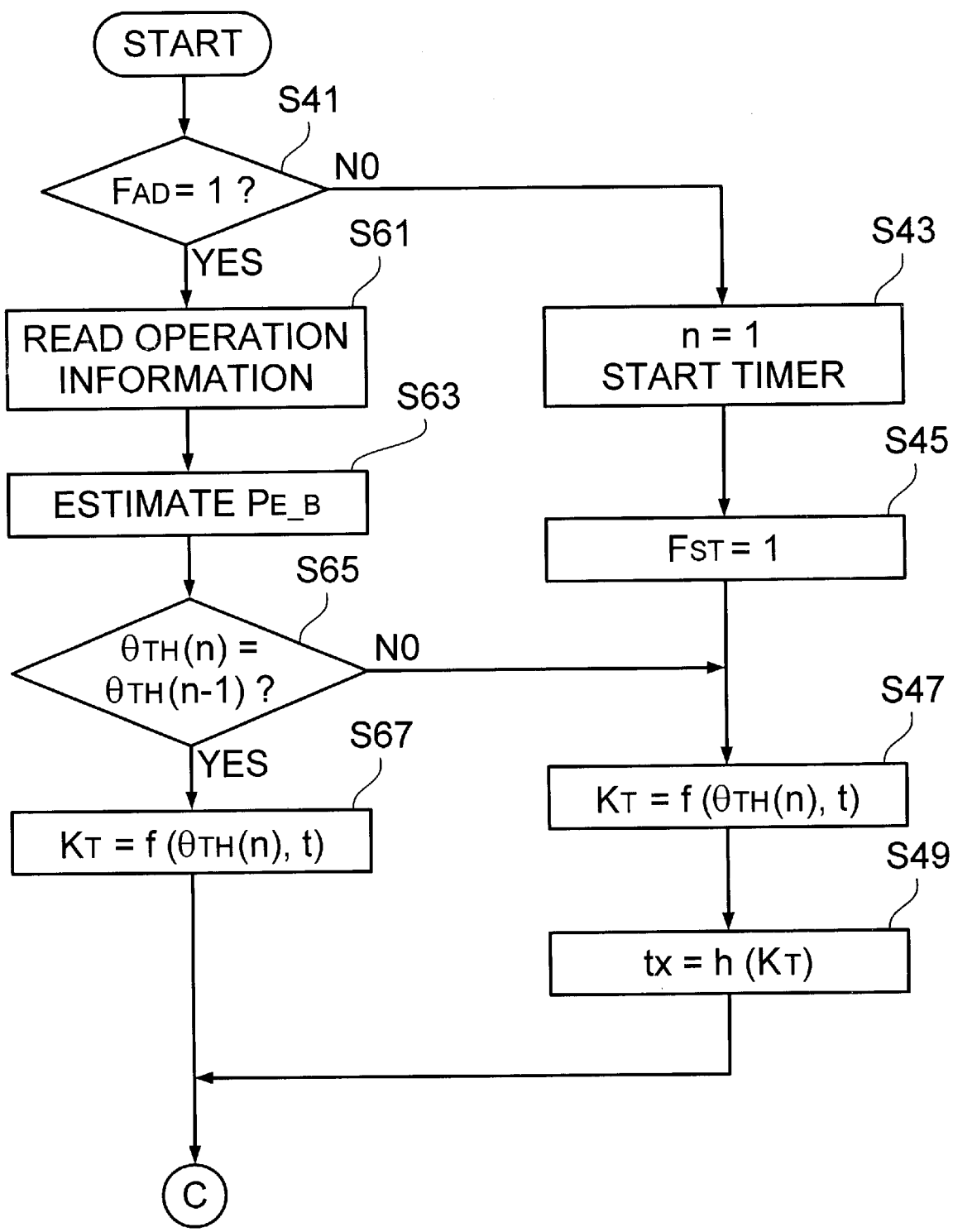
FIG. 9 is a flowchart showing a part of a subroutine for advance control in an acceleration of the DI engine.
Figure 10:
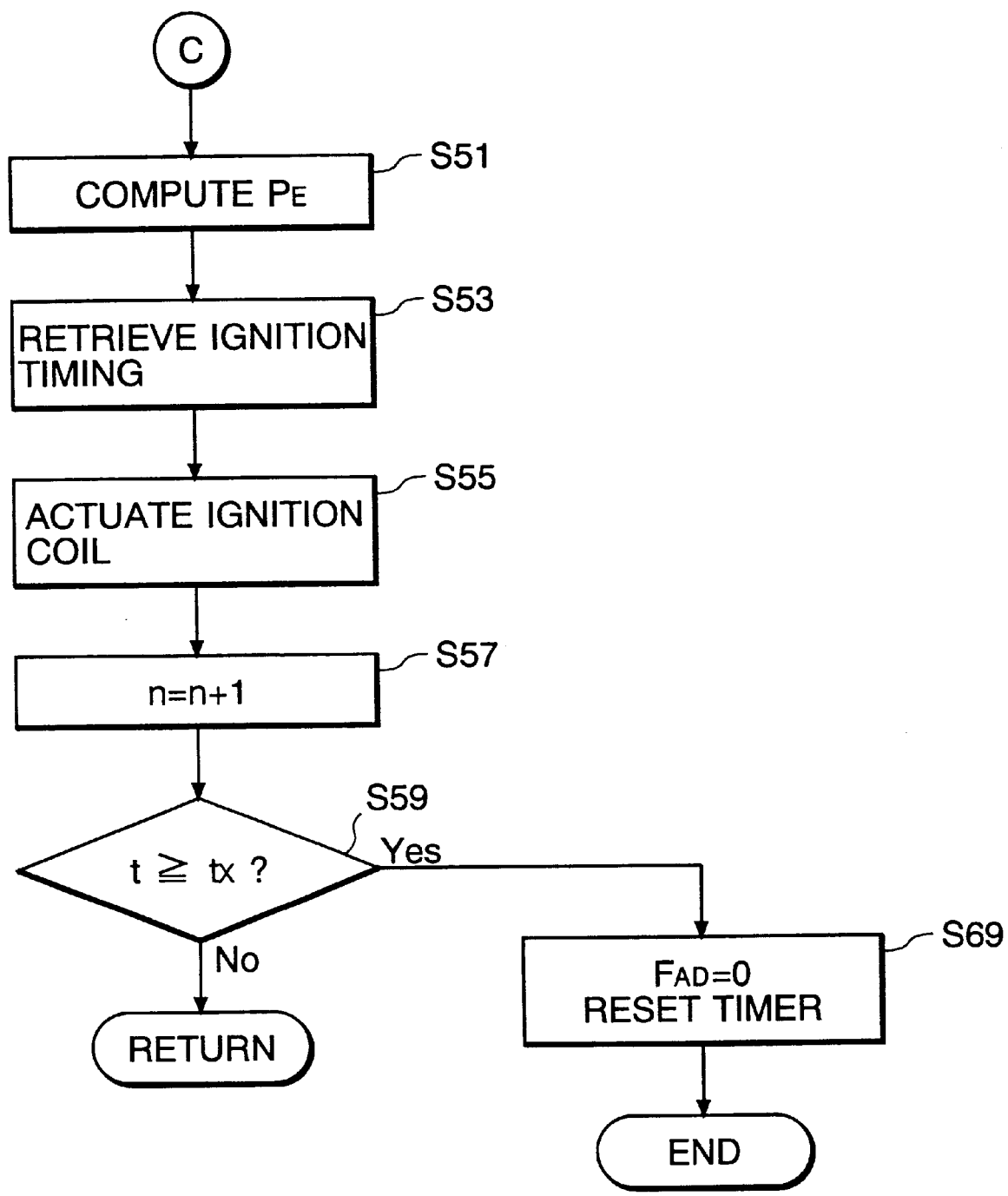
FIG. 10 is a flowchart showing the remaining part of the advance control subroutine.

Referring now to the flowcharts of FIGS. 6 to 10, ignition timing control, estimation of the wall temperature of the cylinder 6, and advance control for acceleration will be described. In FIGS. 9 and 10, reference a parameter with (n) denotes a value obtained at the present cycle, and a parameter with (n−1) denotes a value obtained at the preceding cycle.

Ignition Timing Control/Estimation of Wall Temperature

Figure 6:
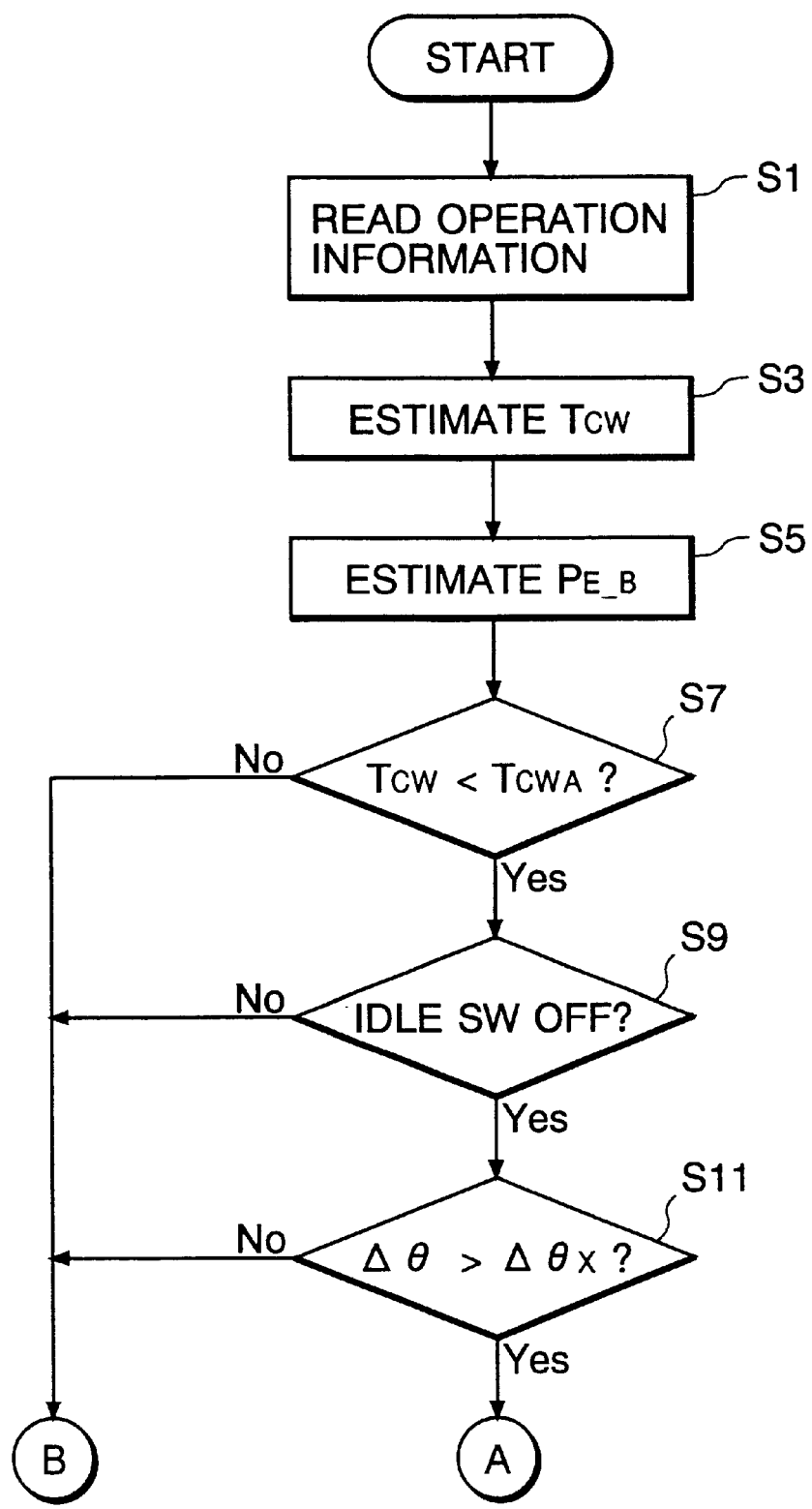
FIG. 6 is a flowchart showing a part of a subroutine for ignition timing control.
Figure 7:
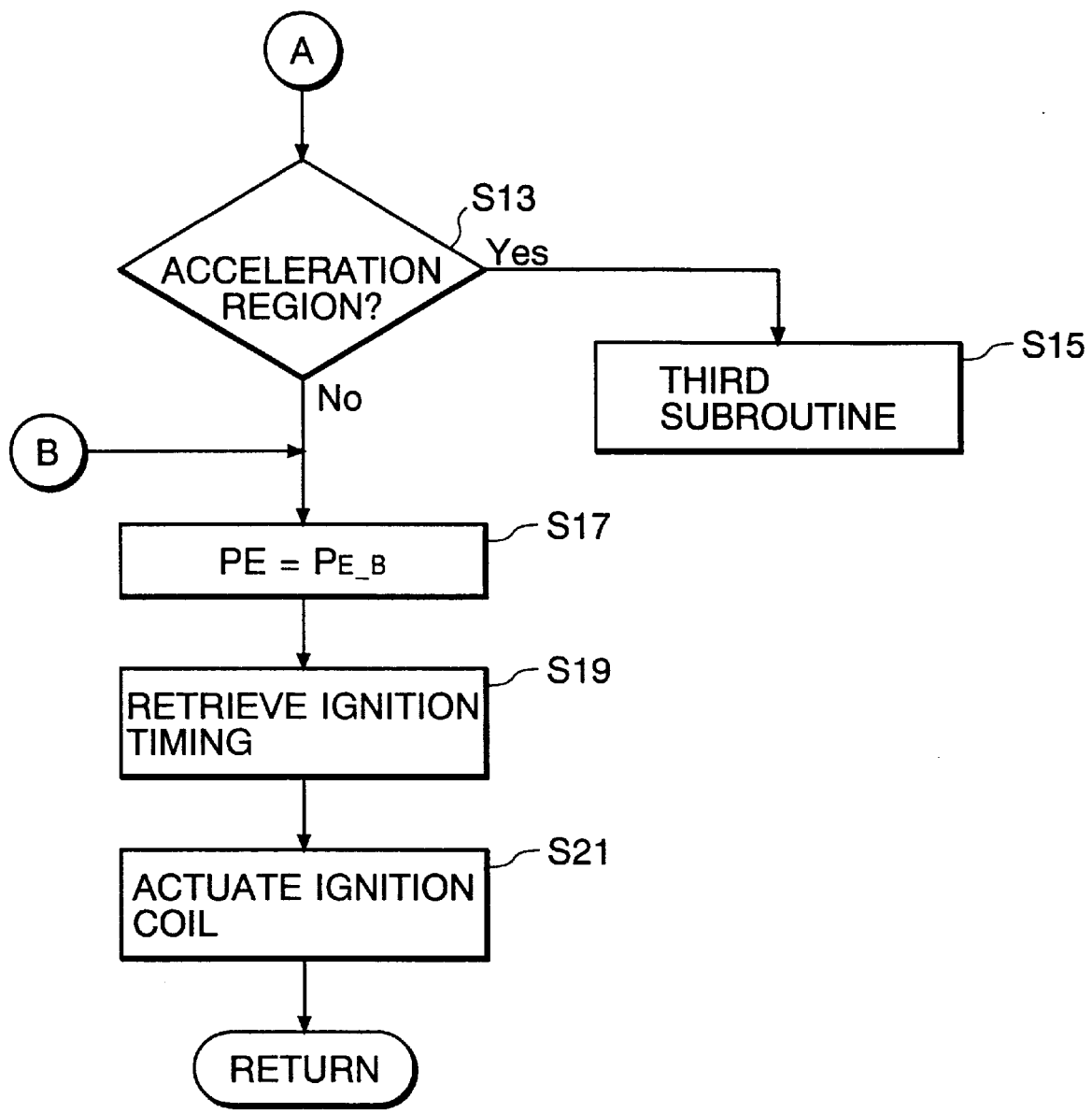
FIG. 7 is a flowchart showing the remaining part of the subroutine for ignition timing control.

When the driver turns on the ignition key to start the engine 1, the ECU 70 repeatedly executes a first subroutine for ignition timing control shown in FIGS. 6 and 7 at a predetermined control cycle (e.g., 10 ms).

First, in Step S1, the ECU 70 reads engine operation information data in response to output signals from the various sensors. In Step S3, thereafter, reads a wall temperature $T_{CW}$ of the cylinder 6 from the storage unit 71 or RAM of the ECU 70.

During the operation of the engine 1, the ECU 70 executes a second subroutine (FIG. 8) for wall temperature estimation, along with the first subroutine (FIGS. 6 and 7), thereby repeatedly estimating the wall temperature $T_{CW}$ of the cylinder 6. More specifically, the ECU 70 first determines in Step S31 whether or not a starting flag $F_{ST}$ is 1. The starting flag $F_{ST}$, which is used to discriminate the starting of the engine 1, is reset at 0 every time the ignition key is turned on. At the start (including restart) of the engine operation, therefore, the decision in Step S31 is No, whereupon the ECU 70 substitutes the operation information data read in Step S1, that is, cooling water temperature $T_W$ (20° C. to 95° C. in general), for the wall temperature $T_{CW}$ in Step S33, and stores the RAM with the wall temperature $T_{CW}$. In Step S35, thereafter, the starting flag $F_{ST}$ is set at 1.

Figure 8:
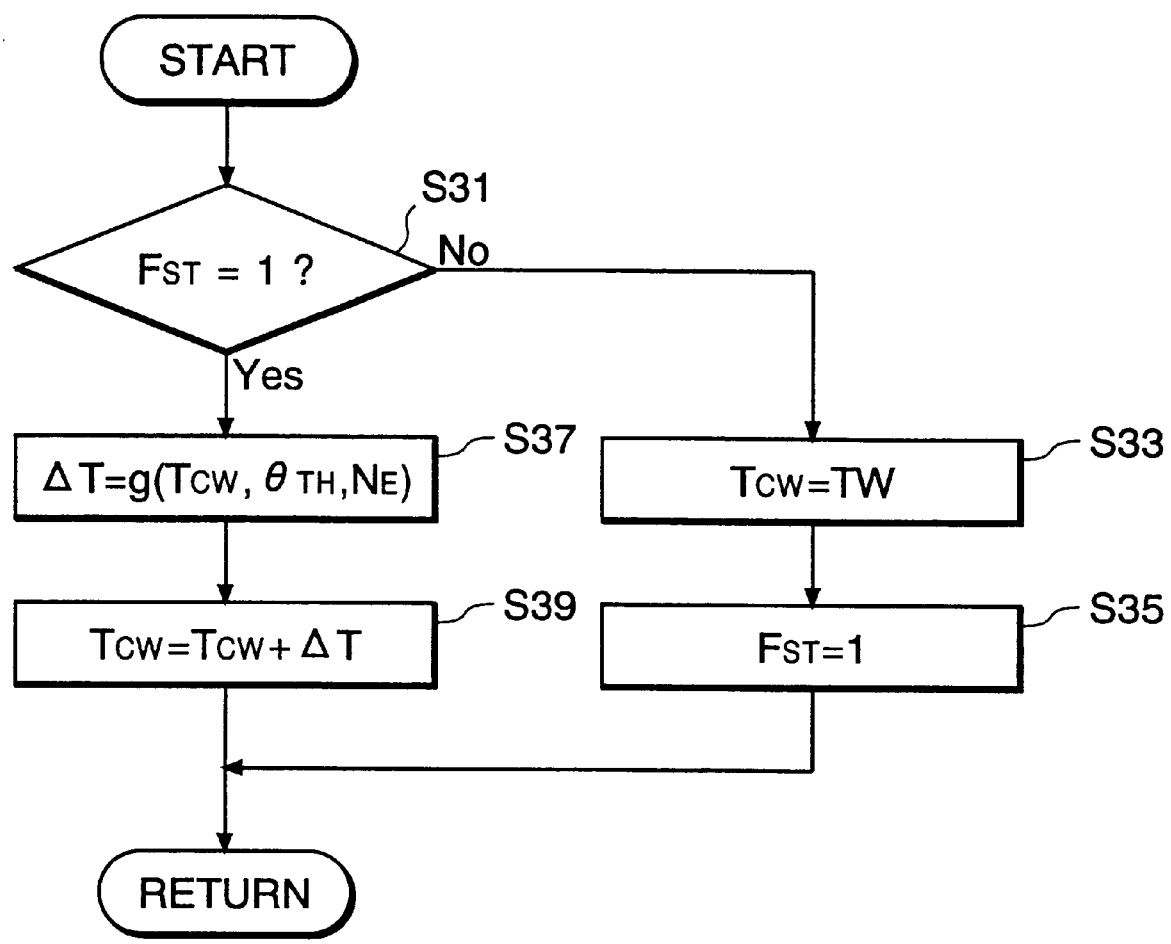
FIG. 8 is a flowchart showing a subroutine for estimating the wall temperature of a combustion chamber of the DI engine.

As the second subroutine of FIG. 8 is executed repeatedly, thereafter, the decision in Step S31 becomes Yes, so that the ECU 70 obtains a variation $\Delta T$ of the wall temperature $T_{CW}$ in Step S37. The variation $\Delta T$ is computed according to a function $g(T_{CW}, \theta_{TH}, N_E)$ based on the wall temperature $T_{CW}$, throttle opening $\theta_{TH}$, and engine speed $N_E$ as its parameters. The throttle opening $\theta_{TH}$ and the engine speed $N_E$ are also already read as two of the engine operation information data. Thereafter, the ECU 70 stores the RAM with a new wall temperature value $T_{CW}$ which is obtained by adding the variation $\Delta T$ to the wall temperature $T_{CW}$ loaded from the RAM. The variation $\Delta T$ takes a positive value when the engine 1 is in an operation state such that the average temperature of the inner surface of the combustion chamber 5 is higher than the wall temperature $T_{CW}$. When the engine 1 is in an operation state such that the average temperature of the inner surface of the combustion chamber 5 is lower than the wall temperature $T_{CW}$, in contrast with this, the variation $\Delta T$ takes a negative value. Thus, when the engine 1 proceeds to idle operation after its starting is completed, the wall temperature $T_{CW}$ is equilibrated at a value corresponding to the load conditions of the engine 1.

After the wall temperature $T_{CW}$ is read in the aforesaid manner in Step S3, a basic target average effective pressure $P_{E\_B}$ is estimated on the basis of the engine speed $N_E$, throttle opening $\theta_{TH}$, etc. in Step S5. Then, in Step S7, the ECU 70 determines whether or not the wall temperature $T_{CW}$ is lower than a predetermined value $T_{CWA}$ (e.g., 150° C.). Alternatively, the wall temperature $T_{CW}$ may be compared to a parameter of which the value varies depending on the operation state of the engine 1 in Step S7, in place of the predetermined value $T_{CWA}$.

If the decision in Step S7 is Yes, the ECU 70 determines in Step S9 whether or not the idle switch 30 is off (throttle valve 28 is not closed). An output signal from the idle switch 30 is also already read as one of the engine operation information data in Step S1. If the decision in Step S9 is Yes, the ECU 70 determines in Step S11 whether or not a valve-opening speed $\Delta\theta$ of the throttle valve 28 is higher than a predetermined value $\Delta\theta_x$. The valve-opening speed $\Delta\theta$ can be obtained by differentiating the throttle opening $\theta_{TH}$ with time.

Figure 11:
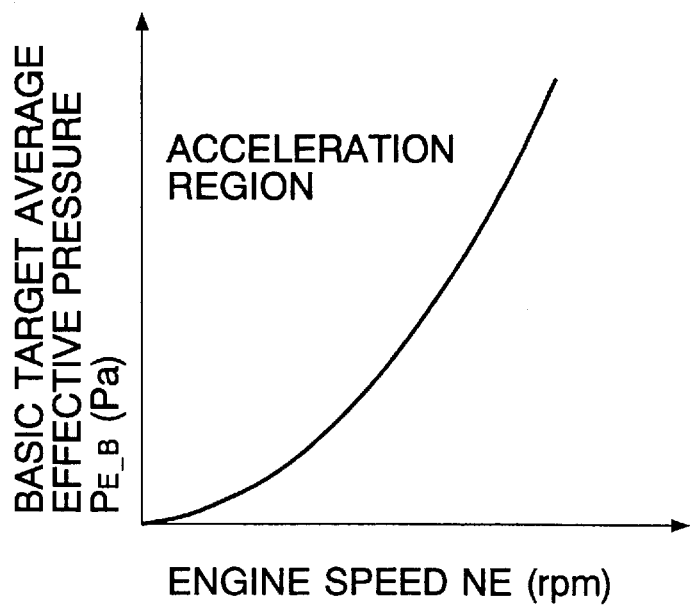
FIG. 11 is a diagram showing a map for identifying an acceleration region of the DI engine.

If the decision in Step S11 is Yes, the ECU 70 determines in Step S13 of FIG. 7 whether or not the current operation state of the engine 1 in an acceleration region. This determination is made in accordance with the basic target average effective pressure $P_{E\_B}$ and the engine speed $N_E$ with reference to the map of FIG. 11. If the decision in Step S13 is Yes, the ECU 70 executes a third subroutine for advance control for acceleration (mentioned later) in Step S15.

Figure 12:
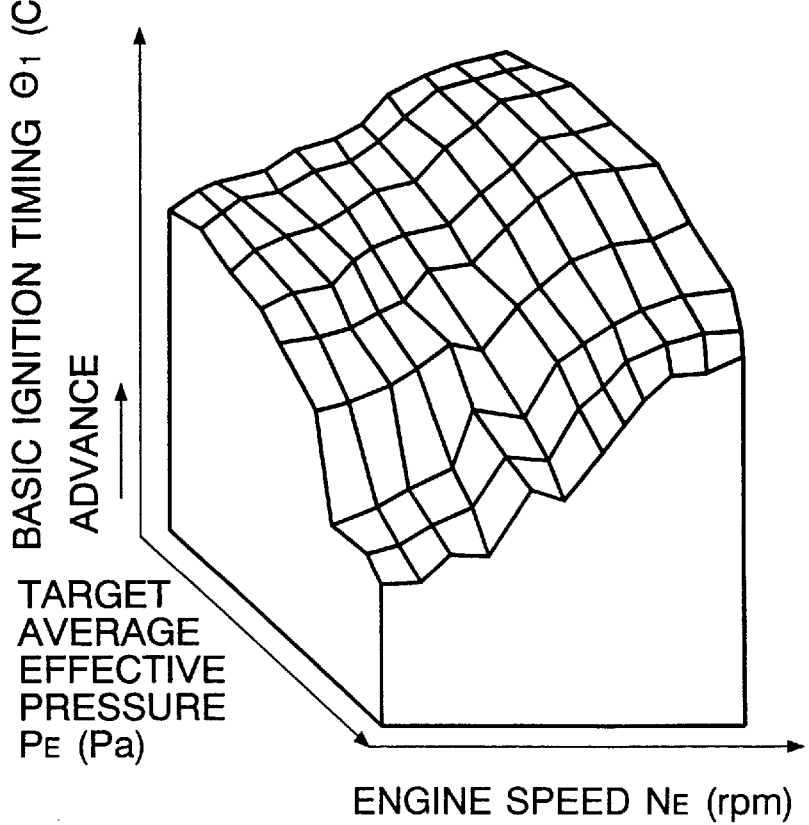
FIG. 12 is a diagram showing a map for determining the ignition timing.

If any of the decisions in Steps S7, S9, S11 and S13 is No, the ECU 70 carries out normal ignition timing control without executing the third subroutine. More specifically, the ECU 70 first sets the basic target average effective pressure $P_{E\_B}$ as a target average effective pressure $P_E$ in Step S17. Then, in Step S19, the ECU 70 retrieves a basic ignition timing $\ominus 1$ from the map of FIG. 12 in accordance with the target average effective pressure $P_E$, which represents the engine load information data, and the engine speed $N_E$. The map of FIG. 12 is prepared for each control zone shown in FIG. 3. In Step S21, thereafter, the ECU 70 actuates the ignition coil 19 in accordance with the basic ignition timing $\ominus 1$, whereupon the coil 19 generates high voltage to the spark plug 3, thereby firing the air-fuel mixture in the cylinder 6. It is to be understood that the air-fuel mixture used here is prepared according to air-fuel ratio control and the injection mode that is determined by the selected control zone.

If the decisions in Steps S7, S9, S11 and S13 are all Yes, on the other hand, the ECU 70 executes the aforesaid third subroutine, which is shown in FIGS. 9 and 10. In this third subroutine, the ECU 70 first determines in Step S41 whether or not an advance control flag $F_{AD}$ is 1. The advance control flag $F_{AD}$, which is used to discriminate the start of the advance control for the vehicle's acceleration, is reset at 0 when the ignition key is turned on. Accordingly, the decision in Step S41 is No when the third subroutine is first executed, whereupon the ECU 70 sets a program variable n at 1 and starts the operation of a timer t in Step S43. In Step S45, thereafter, the ECU 70 sets the advance control flag $F_{AD}$ at 1.

Then, in Step S47, the ECU 70 computes a time coefficient $K_T$ in accordance with the throttle opening $\theta_{TH}(n)$ read in the first subroutine (Step S1) for the present cycle and the value (control time elapsed) in the timer t. More specifically, the time coefficient $K_T$ is computed according to a function $f(\theta_{TH}(n), t)$ based on the throttle opening $\theta_{TH}(n)$ and the timer value t as its parameters. It is to be noted that the time coefficient $K_T$, which is computed with the throttle opening $\theta_{TH}(n)$ as the parameter, is a variable that is associated with the wall temperature in the combustion chamber 5.

In Step S49, thereafter, the ECU 70 computes an advance control time $t_x$ in accordance with the time coefficient $K_T$. The advance control time $t_x$ is computed according to a function $h(K_T)$ based on the time coefficient $K_T$ as its parameter. The time coefficient $K_T$ takes a positive value that decreases as the throttle opening $\theta_{TH}(n)$ and the timer value t increase. On the other hand, the advance control time $t_x$ takes a value that decreases in proportion to the decrease of the time coefficient $K_T$.

When the time coefficient $K_T$ and the advance control time $t_x$ are computed, the ECU 70 calculates the target average effective pressure $P_E$ in Step S51 as follows:

$$P_E 32\ P_{E\_B} - P_E'(\theta_{TH}) \cdot K_{NE} \cdot K_T, \quad (1)$$

where $P_E'(\theta_{TH})$ is a positive correction value that is set in accordance with the throttle opening $\theta_{TH}(n)$ or the engine load. This correction value $P_E'(\theta_{TH})$ is previously stored in the storage unit 71 or ROM of the ECU 70, and is read from the ROM. Further, $K_{NE}$ is a a positive speed coefficient set in accordance with the engine speed $N_E$.

Then, the ECU 70 retrieves the basic ignition timing $\ominus 1$ from the map of FIG. 12 in accordance with the target average effective pressure $P_E$ and the engine speed $N_E$ in Step S53, and actuates the ignition coil 19 in accordance with the retrieved basic ignition timing $\ominus 1$ in Step S55. Thereupon, the ignition coil 19 generates high voltage to the spark plug 3, thereby firing the air-fuel mixture in the cylinder 6.

Figure 13:
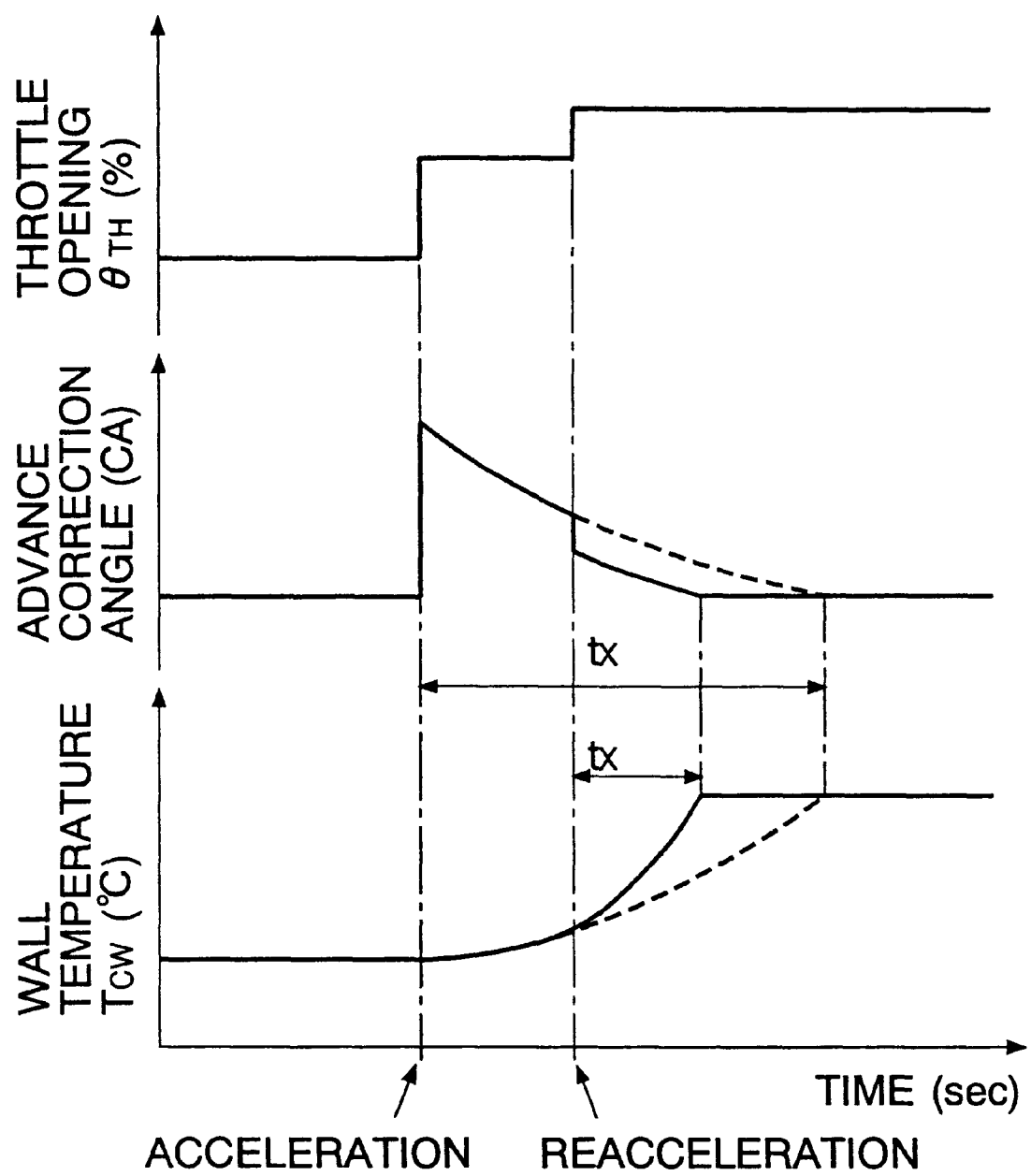
FIG. 13 is a graph showing changes of the correction angle for advance of the ignition timing and the wall temperature of the combustion chamber.

Since the second term of the right side of equation (1) is a positive value, the target average effective pressure $P_E$ computed according to equation (1) takes a value smaller than that of the basic target average effective pressure $P_{E\_B}$. Accordingly, the basic ignition timing $\ominus 1$ is changed to the advance side, as seen from the map of FIG. 12, so that the correction angle for advance takes a large value. Immediately after the vehicle's acceleration, therefore, an advance correction angle CA has a large value, as shown in FIG. 13, so that an actual ignition timing $\ominus$ is advanced ahead of the basic ignition timing $\ominus 1$ by a large margin. As a result, the output of the engine 1 is enhanced without increasing the fuel consumption. In other words, since the required injection quantity of the fuel to generate the same output is decreased, the fuel consumption can be reduced.

Immediately before the vehicle's acceleration, the engine 1 is operated in the low-speed zone under a relatively low load, so that the wall temperature $T_{CW}$ of the cylinder 6 is relatively low. Even though the actual ignition timing $\ominus$ is advanced, therefore, the engine 1 never knocks.

Thereafter, the ECU 70 adds 1 to the program variable n in Step S57, and determines in Step S59 whether or not the advance control time $t_x$ is equal to or less than the value in the timer t. If the decision in this step is No, the ECU 70 returns to the start of the third subroutine, whereupon the execution of the third subroutine is repeated.

Since the decision in Step S41 becomes Yes as the third subroutine for the next cycle is executed, the ECU 70 reads the various engine operation information data (Step S61), as in the aforementioned case of Step S1. In Step S63, thereafter, the ECU 70 estimates the basic target average effective pressure $P_{E\_B}$ in accordance with the suction pressure Pb, throttle opening $\theta_{TH}$, etc. Then, in Step S65, the ECU 70 determines whether or not the present throttle opening $\theta_{TH}(n)$ is equal to a preceding throttle opening $\theta_{TH}(n-1)$. If the decision in this step is Yes, that is, if it is concluded that the depth of depression of the accelerator pedal is kept constant, the ECU 70 computes the time coefficient $K_T$ again in Step S67. The value in the timer t represents the time having elapsed since the start of the execution of the third subroutine. At this point of time, therefore, the value in the timer t is increased, so that the value of the time coefficient $K_T$ computed from the aforesaid function f becomes smaller.

Thereafter, the ECU 70 executes Step S51 and the subsequent steps. Here it is to be noted that Step S49 is skipped. Thus, the advance control time $t_x$ is kept at a preceding value, that is, an initial value obtained when the third subroutine is first executed.

The computation of the target average effective pressure $P_E$ and the retrieval of the basic ignition timing $\ominus 1$ are executed in the same manner as aforesaid in Steps S51 and S53, and the ignition coil 19 is actuated in like manner. As the value of the time coefficient $K_T$ decreases, in this case, the value of the second term of the right side of equation (1) also decreases, so that the target average effective pressure $P_E$ increases. As seen from FIG. 13, therefore, the advance of the actual ignition timing $\ominus$ is gradually reduced. Thus, even though the wall temperature $T_{CW}$ of the cylinder 6 rises as the engine loads increase after the start of the vehicle's acceleration, the actual ignition timing $\ominus$ is retarded corresponding to the wall temperature $T_{CW}$ rise, so that the engine 1 can be prevented from knocking.

If the decision in Step S59 becomes Yes as the third subroutine is repeatedly executed, the ECU 70 resets the advance control flag $F_{AD}$ at 0, and at the same time, stops the operation of the timer t and resets the value in the timer t at 0, in Step S69. Thereafter, the ECU 70 returns to the first subroutine of FIGS. 6 and 7, whereupon it executes the normal ignition timing control.

The greater the throttle opening $\theta_{TH}(n)$, the shorter the time in which the wall temperature $T_{CW}$ increases to the level that causes knocking. If the throttle opening $\theta_{TH}(n)$ is large, however, the time coefficient $K_T$ takes a small value, as mentioned before. If the value of the time coefficient $K_T$ is small, the aforesaid initial value of the advance control time $t_x$ is also small. In an engine operation state such that the rising speed of the wall temperature $T_{CW}$ increases, that is, during high-load operation of the engine 1, therefore, the decision in Step S59 becomes Yes in a relatively short time, so that the advance control or the third subroutine terminates in a short period of time.

In the case where the decision in Step S65 is No or if the present throttle opening $\theta_{TH}(n)$ is greater or smaller than the preceding throttle opening $\theta_{TH}(n-1)$, that is, if it is concluded that the depression of the accelerator pedal is deepened or lessened during the execution of the third subroutine, on the other hand, the ECU 70 computes the time coefficient $K_T$ and the advance control time $t_x$ again in Steps S47 and S49, and thereafter, executes Step S51 and the subsequent steps in the same manner as aforesaid. Thus, even when the rising speed of the wall temperature $T_{CW}$ changes as the engine loads increase or decrease, the computation of the target average effective pressure $P_E$ and the retrieval of the basic ignition timing $\ominus 1$ are executed again, so that the advance of the actual ignition timing $\ominus$ can be controlled optimally.

FIG. 13 shows change of the advance of the ignition timing for a vehicle's reacceleration, for example. This reacceleration means the accelerator pedal is further depressed without lessening its depression after the accelerator pedal has been depressed. In this case, the time coefficient $K_T$ computed again in Step S47 is further lessened, and the advance of the actual ignition timing $\ominus$ for reacceleration is reduced as seen from FIG. 13. Since the advance control time $t_x$ that is computed again in Step S49 is also lessened, moreover, the execution time for the advance control is shortened. If the throttle opening $\theta_{TH}$ is reduced, in contrast with this, the advance of the actual ignition timing $\ominus$ increases, and the advance control time $t_x$ is lengthened.

According to the above description, the advance of the actual ignition timing $\ominus$ and the advance control time $t_x$ are increased or decreased simultaneously. The output required of the engine 1 varies depending on the running conditions of the vehicle (e.g., for the vehicle's starting or constant-speed running). Only the advance of the actual ignition timing $\ominus$ or the advance control time $t_x$ may be therefore increased or decreased.

In the initial stage of acceleration with the wall temperature $T_{CW}$ kept at a relatively low level, as is evident from the above description, the actual ignition timing $\ominus$ is advanced within a range such that the engine 1 is prevented from knocking, so that the engine output can be enhanced, and the acceleration performance of the vehicle can be improved. Since the combustion energy can be utilized effectively, moreover, the fuel consumption can be reduced.

According to the embodiment described above, the target average effective pressure is corrected in controlling the advance of the ignition timing for the vehicle's acceleration. If a map with reference to which the correction angle for the advance of the ignition timing is obtained from the throttle opening, engine speed, etc. is prepared in advance, however, the actual ignition timing can be also obtained by adding the obtained advance correction angle to the basic ignition timing. Alternatively, the actual ignition timing may be obtained by multiplying the basic ignition timing obtained directly from the target average effective pressure during the vehicle's acceleration by a correction factor corresponding to the acceleration. Further, an exclusive ignition timing map for acceleration may be separately prepared so that the actual ignition timing can be obtained from this ignition timing map during the vehicle's acceleration.

Modification of Ignition Timing Control

Figure 14:
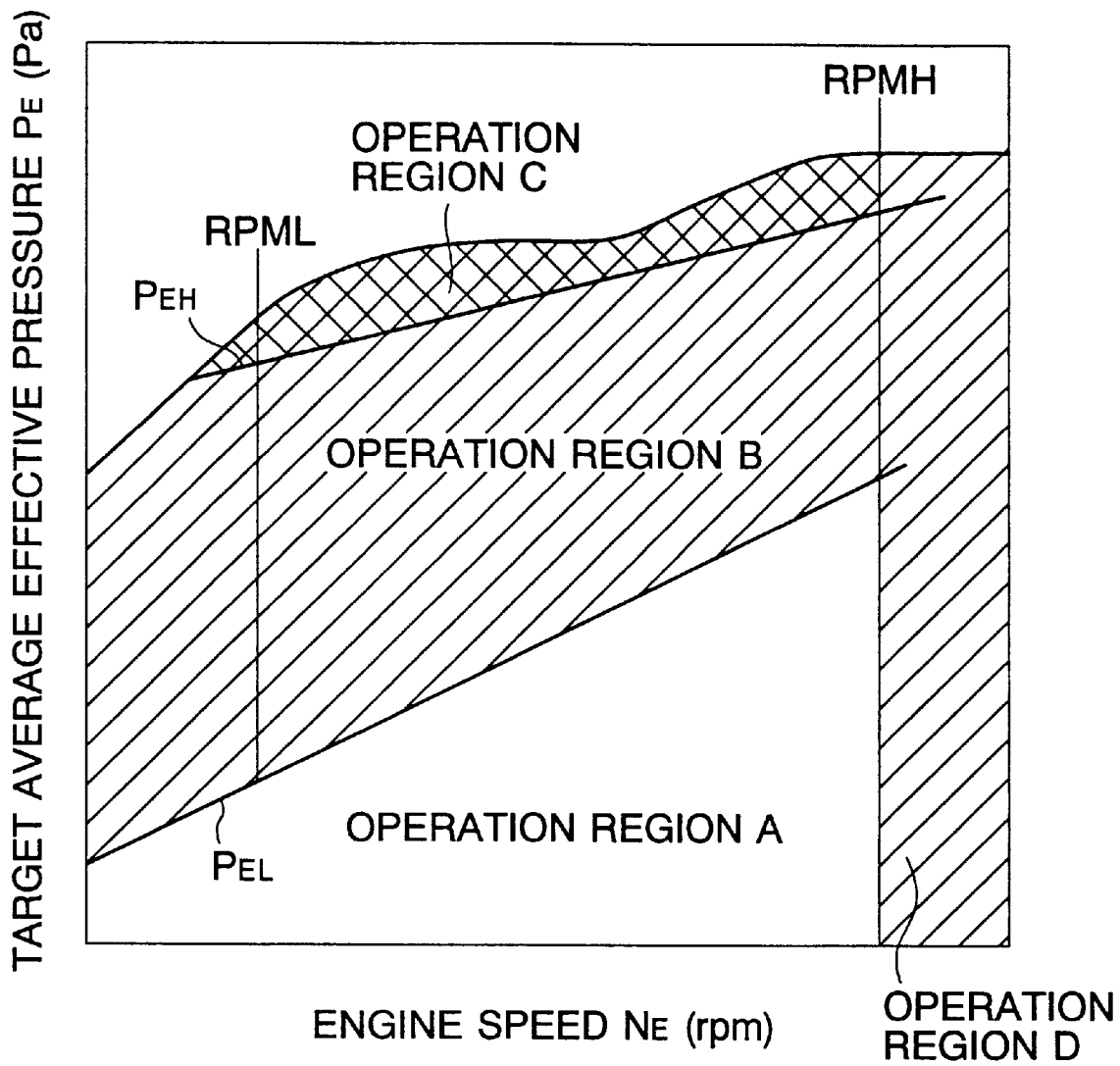
FIG. 14 is a graph showing advance regions for acceleration based on the operation state as a parameter.
Figure 15:
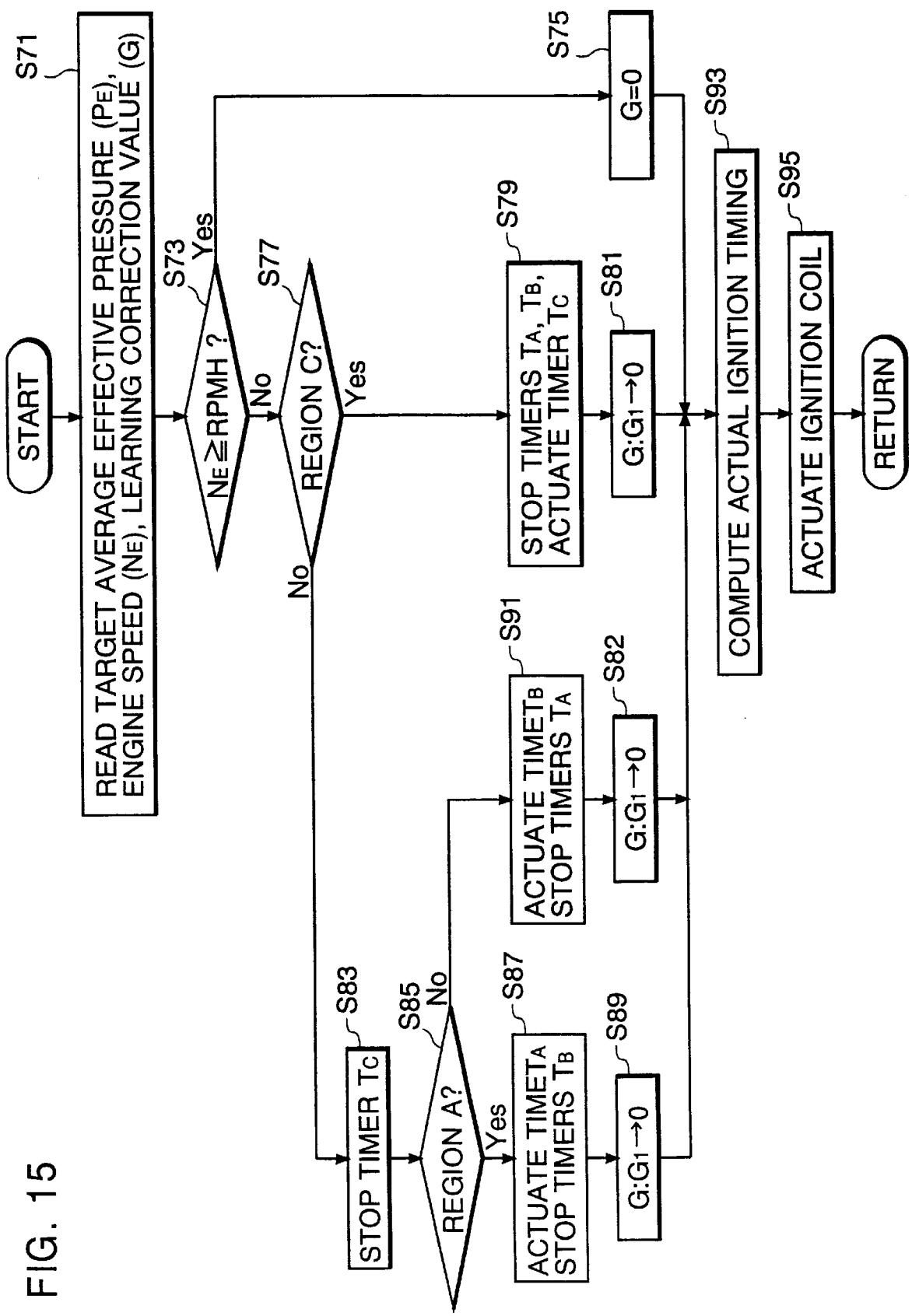
FIG. 15 is a flowchart showing a modification of the ignition timing control.

Referring now to FIGS. 14 and 15, a modification of the ignition timing control will be described.

The ECU 70 computes the optimum ignition timing or actual ignition timing $\ominus$ according to the equation given below, where $\ominus 1$ (see FIG. 12) is a basic ignition timing for steady-state operation, which is determined depending on the engine loads and the engine speed $N_E$ in consideration of the prevention of knocking, $\ominus 2$ is a correction value used to correct the advance of the basic ignition timing $\ominus 1$ when the engine 1 is in transient operation (high-load operation), G ($0 \leq G \leq 1$) is a learning correction value for determining the degree of reflection of the correction value $\ominus 2$, and K is a correction value based on some other parameters, such as intake air temperature, water temperature, etc. The optimum ignition timing is an ignition timing such that a maximum torque can be produced in the engine 1 without causing the engine 1 to knock in the engine load conditions at the time concerned. More specifically, the optimum ignition timing has an advance angle approximate to the aforementioned MBT when the engine 1 is being operated under medium or higher load.

The correction value $\ominus 2$ is previously stored in the aforesaid storage unit 71 or ROM of the ECU 70, and is read from the ROM.

In the case where the engine 1 is being operated in an operation region C shown in FIG. 14, the actual ignition timing $\ominus$ is $$\ominus = \ominus 1 + (\ominus 2 \cdot G) + K. \qquad (2)$$

In the case where the engine 1 is being operated in any other operation region than the operation region C of FIG. 14, the actual ignition timing $\ominus$ is $$\ominus = \ominus 1 + K. \qquad (3)$$

As seen from FIG. 14, the operation region C represents a range (preferably with the throttle valve fully open) in which the engine speed $N_E$ is between a lower limit value RPML (e.g., speed a little lower than the idle speed) and a upper limit value RPMH (e.g., speed near the maximum engine speed), and the target average effective pressure $P_E$ is not below an upper threshold line $P_{EH}$. The upper threshold line $P_{EH}$ is inclined upward from the lower limit value RPML to the upper limit value RPMH. More specifically, the operation region C indicates that the engine 1 is in high-load operation. In the operation region C, therefore, the driver requires the deepest feeling of acceleration of the vehicle, that is, the engine 1 requires an increase in output torque.

In FIG. 14, an operation region B represents a range in which the engine speed $N_E$ is not higher than the upper limit value RPMH and the target average effective pressure $P_E$ is between the upper threshold line $P_{EH}$ and a lower threshold line $P_{EL}$. An operation region A represents a range in which the engine speed $N_E$ is lower than the upper limit value RPMH and the target average effective pressure $P_E$ is below the lower threshold line PEL. Also, an operation region D represents a range in which the engine speed $N_E$ is not lower than the upper limit value RPMH. The lower threshold line $P_{EL}$ is inclined at a greater gradient than and in the same direction as the upper threshold line $P_{EH}$.

In equation (2), the learning correction value G is set in order to restrict or reduce the correction value $\ominus 2$ corresponding to the increase of the wall temperature $T_{CW}$. When the engine 1 is undergoing steady-state operation in the operation region A with the wall temperature $T_{CW}$ kept at a relatively low value, the learning correction value G gradually increases toward its maximum value, 1, with the passage of time. When the engine 1 is undergoing steady-state operation in any other operation region than the operation regions A and D with the wall temperature $T_{CW}$ kept at a higher value, on the other hand, the learning correction value G gradually decreases toward its minimum value, 0, with the passage of time. When the engine 1 is being operated in the operation region D, moreover, the learning correction value G is reset at the minimum value 0.

The learning correction value G is also associated with the wall temperature $T_{CW}$. More specifically, when the operation of the engine 1 is in the operation region A after the engine 1 has been operated under high engine load in any other operation region than the operation regions A and D so that the wall temperature $T_{CW}$ goes high, the wall temperature $T_{CW}$ lowers from high temperature to low. The learning correction value G is changed from the minimum value 0 to the maximum value 1 at an increasing rate corresponding to the rate of the lowering of the wall temperature $T_{CW}$.

When the operation of the engine 1 is in any other operation region than the operation regions A and D under high engine load after the engine 1 has been operated in the operation region A so that the wall temperature $T_{CW}$ goes low, in contrast with this, the wall temperature $T_{CW}$ rises from low temperature to high. The learning correction value G is changed from the maximum value 1 into the minimum value 0 at a decreasing rate corresponding to the rate of the rise of the wall temperature $T_{CW}$. The decreasing rate of the value G is set at a higher value than the increasing rate. For example, the time required for the learning correction value G to change from the minimum value 0 to the maximum value 1 is adjusted to about 70 to 90 seconds, while the time required for the value G to change from the maximum value 1 to the minimum value 0 is adjusted to about 20 to 30 seconds.

The learning correction value G is stored in the RAM of the ECU 70 and is updated as required, depending on which operation region the engine 1 is in and the direction of change of the engine operation region. When the engine 1 is being operated in the operation region C, therefore, the learning correction value G, which indicates the past operation state of the engine 1, is reflected in the actual ignition timing $\ominus$ computed according to equation (2).

The following is a specific description of the modification of the ignition timing control.

When the engine 1 is started as the driver turns on the ignition key, the ECU 70 first reads the engine speed $N_E$ and the target average effective pressure $P_E$ that is indicative of the load information. Based on the engine speed $N_E$ and the target average effective pressure $P_E$, the ECU 70 discriminates the current engine operation region among the regions shown in FIG. 14.

When the engine 1 is being operated in the operation region A, the actual ignition timing $\ominus$ is computed according to equation (3), and the learning correction value G is gradually changed to the maximum value 1 in accordance with the stay of the engine 1 in the operation region A.

When the engine 1 is being operated in the operation region B (medium-load zone), the ECU 70 computes the actual ignition timing $\ominus$ according to equation (3) in the same manner as in the case of the operation in the operation region A. In this case, the learning correction value G is gradually changed to the minimum value 0 in accordance with the state of the engine 1 in the operation region B.

The operation of the engine 1 in the operation region B implies the driver's request for the acceleration of the vehicle. When the engine 1 is in the operation region B, however, the actual ignition timing $\ominus$ is computed according to equation (3), so that the correction of its advance is not carried out. When the engine 1 is in the operation region B, the engine 1 can generate the required output by only adjusting the opening of the intake adjusting mechanism (including the throttle valve, air bypass valve, etc.) without the execution of the advance correction.

When the engine 1 is being operated in the operation region C, the ECU 70 concludes that the engine operation is in the acceleration region. In this case, the actual ignition timing $\ominus$ is computed according to equation (2). Accordingly, the actual ignition timing $\ominus$ is advanced in accordance with the result of multiplication of the ignition timing correction value $\ominus 2$ by the learning correction value G. Also in this case, the learning correction value G is gradually changed to the minimum value 0 in accordance with the stay of the engine 1 in the operation region C. Thus, the advance of the actual ignition timing $\ominus$ is reduced with the passage of time.

When the engine 1 is being operated in the operation region D, the actual ignition timing $\ominus$ is computed according to equation (3), and the learning correction value G is reset to the minimum value 0. The value G is reset because the rise of the wall temperature $T_{CW}$ cannot be estimated when the engine 1 is in the operation region D.

Thereafter, the ECU 70 actuates the ignition coil 19 in accordance with the actual ignition timing $\ominus$ computed for each operation region, whereupon the coil 19 generates high voltage to the spark plug 3, thereby firing the air-fuel mixture in the cylinder 6.

The following is a description of the case where the operation region of the engine is changed.

Supposing that the engine 1 continues to be operated in the operation region B or C, and the learning correction value G is reduced to the minimum value 0. Suppose, moreover, the engine 1 temporarily proceeds from the operation region B or C to the operation region A, thereafter, and then from the region A to the region C. In this case, the period of time, in which the engine 1 is in the operation region A is so short that the learning correction value G is hardly changed toward the maximum value 1, and is in the vicinity of the minimum value 0. Even if the actual ignition timing $\ominus$ is computed according to equation (2) with the engine 1 in the operation region C, therefore, the value of the second term of the right side of equation (2) is so small that the advance of the actual ignition timing $\ominus$ is hardly corrected. This is because the period of time in which the engine 1 is in the operation region A, is so short that the wall temperature $T_{CW}$ is not lowered satisfactorily. If the advance correction for the actual ignition timing $\ominus$ in the operation region C is carried out in this situation, the engine 1 is likely to knock.

Supposing, furthermore, that the engine 1 is being operated in the operation region A with the learning correction value G at the maximum value 1. Also suppose the engine 1 proceeds from the operation region A to the operation region B, thereafter, and then proceeds to the operation region C after being in the operation region B for a long period of time. In this case, the learning correction value G is changed to or close to the minimum value 0. Practically, therefore, the advance correction for the actual ignition timing $\ominus$ is not carried out even though the engine 1 is in the operation region C. This is because the period of time in which the engine 1 was in the operation region B, is so long that the wall temperature $T_{CW}$ is high. If the advance correction for the actual ignition timing $\ominus$ is carried out in this situation, the engine 1 is likely to knock.

Supposing, moreover, that the engine 1 proceeds from the operation region A, B or C to the operation region D, and thereafter, to the operation region C. In this case, the learning correction value G is reset to the minimum value 0, so that the advance correction for the actual ignition timing $\ominus$ is not carried out. This is because the degree of increase of the wall temperature $T_{CW}$ cannot be estimated when the engine 1 is being operated in the operation region D. Thus, knocking of the engine 1 attributable to positive advance correction for the actual ignition timing $\ominus$ can be prevented.

Referring now to the flowchart of FIG. 15, the aforementioned ignition timing control will be described in detail.

The ECU 70 reads the target average effective pressure (load) $P_E$ of the engine 1, engine speed $N_E$, and learning correction value G (Step S71). Then, the ECU 70 determines whether or not the engine speed $N_E$ is not lower than the upper limit value RPMH (Step S73). If the decision in this step Yes, that is, when the engine 1 is in the operation region D, the learning correction value G is reset to the minimum value 0 (Step S75). Thereafter, the ECU 70 computes the actual ignition timing $\ominus$ according to equation (3) (Step S93). In this case, the advance correction for the actual ignition timing $\ominus$ is not carried out, and the ignition coil 19 is actuated in accordance with the computed actual ignition timing $\ominus$ (Step S95), whereupon the coil 19 fires the spark plug 3.

If the decision in Step S73 is No, the ECU 70 determines whether or not the engine 1 is in the operation region C (high-load operation state) (Step S77). If the decision in this step is Yes, timers $T_A$ and $T_B$ are stopped and reset, while a timer $T_C$ starts to operate (Step S79). The timers $T_A$, $T_B$ and $T_C$ are used to set an update period for the learning correction value G when the engine 1 in the operation region A, B or C.

The next step or Step S81 is executed every time the value in the timer $T_C$ increases by a margin corresponding to a given time $\Delta T_C$. As Step S81 is executed in this manner, a current learning correction value G1 is decreased by a given value $\Delta G$. In Steps S93 and S95, thereafter, the actual ignition timing $\ominus$ is computed according to equation (2), and the ignition coil 19 fires the spark plug 3.

As Step S81 is repeatedly executed with the passage of time, the learning correction value G1 is decreased toward the minimum value 0 by the given value $\Delta G$ at a time. Accordingly, the advance-side correction angle (product of learning correction value G and ignition timing correction value $\ominus$2) for the actual ignition timing $\ominus$ is gradually decreased toward 0.

If the decision in Step S77 is No, that is, when the engine 1 is not in the operation region C, the ECU 70 stops the operation of the timer $T_C$ and resets the value therein (Step S83). Thereafter, the ECU 70 determines whether or not the engine 1 is in the operation region A (Step S85). If the decision in this step is No, that is, when the engine 1 is in the operation region B, the ECU 70 stops the operation of the timer $T_A$ and resets the value therein, and on the other hand, starts the operation of the timer $T_B$ (Step S91).

The next step or Step S82 is executed every time the value in the timer $T_B$ is increased by a given time $\Delta T_B$ ($>\Delta T_C$). As Step S82 is executed in this manner, the current learning correction value G1 is decreased by the given value $\Delta G$. In Steps S93 and S95, thereafter, the actual ignition timing $\ominus$ is computed according to equation (3), and the ignition coil 19 fires the spark plug 3.

As Step S82 is repeatedly executed with the passage of time, therefore, the learning correction value G1 is also decreased toward the minimum value 0 by $\Delta G$ at a time. Since the given time $\Delta T_B$ is longer than $\Delta T_C$, in this case, the decreasing speed of the learning correction value G is lower than in the case where the engine 1 is in the operation region C. When the engine 1 is in the operation region B, the advance correction for the actual ignition timing $\ominus$ is not executed.

If the decision in Step S85 is Yes, that is, when the engine 1 is in the operation region A, the ECU 70 actuates the timer $T_A$, and on the other hand, stops the operation of the timer $T_B$ and resets the value therein (Step S87).

The next step or Step S89 is executed every time the value in the timer $T_A$ is increased by a given time $\Delta T_A$ ($>\Delta T_B$). In Step S89, the current learning correction value G1 is increased by $\Delta G$. In Steps S93 and S95, thereafter, the actual ignition timing $\ominus$ is computed according to equation (3), and the ignition coil 19 fires the spark plug 3.

As Step S89 is repeatedly executed with the passage of time, the learning correction value G1 is increased toward the maximum value 1 by $\Delta G$ at a time. Since the given time $\Delta T_A$ is longer than $\Delta T_B$, in this case, the increasing speed of the learning correction value G is lower than the decreasing speed of the value G obtained when the engine 1 is in the operation region B. When the engine 1 is in the operation region A, the advance correction for the actual ignition timing $\ominus$ is not executed.

A map for setting the actual ignition timing $\ominus$ may be previously provided instead of computing the actual ignition timing $\ominus$ according to equation (2) or (3). In this case, the ECU 70 can read the actual ignition timing $\ominus$ from the map in accordance with the learning correction value G. Also in this case, the learning correction value G has a characteristic such that the speed at which the advance correction for the actual ignition timing $\ominus$ is decreased is higher than the speed at which the advance correction is increased. Thus, the speed at which the learning correction value G decreases from the maximum value 1 to the minimum value 0 is higher than the speed at which the value G increases from the minimum value 0 to the maximum value 1.

The decreasing speed of the learning correction value G may be constant. The higher the loads on the operating engine 1, however, the higher wall temperature $T_{CW}$ is. It is advisable, therefore, to reduce the learning correction value G at a higher speed when the engine 1 is in the operation region C than when the engine 1 is in the operation region B.

When the engine 1 is in the operation region D, the learning correction value G may be gradually decreased in accordance with the state of the engine 1, as in the cases of the operation regions B and C, instead of being reset at the minimum value 0. Preferably, in this case, the decreasing speed of the value G is set to be higher than in the cases of the operation regions B and C.

Further, the ECU 70 may set the learning correction value G to correspond to a minimum value of the wall temperature $T_{CW}$ after the engine 1 is stopped (or the key is turned off). More specifically, the ECU 70 can gradually change the learning correction value G from the minimum value 0 toward the maximum value 1 with the passage of time after the engine 1 is stopped, as in the case where the engine 1 is in the operation region A.

When the engine 1 is restarted in a given period of time after the engine 1 is stopped, the learning correction value G is set at or near the maximum value 1. If the engine 1 proceeds immediately to the operation region C after the restart, that is, when the engine loads suddenly increases, therefore, the advance-side correction angle for the actual ignition timing $\ominus$ takes a large value, so that the engine 1 can generate a high output.

The control system can enjoy a very simple arrangement if the advance control for the actual ignition timing $\ominus$ is executed with use of the learning correction value G. Also in this case, the advance control is carried out in due consideration of the change of the operation state of the engine 1. Even during the high-load engine operation that requires the vehicle's acceleration, therefore, the ignition timing $\ominus$ can be positively advanced without causing the engine 1 to knock, so that the engine output can be improved.

The present invention is not limited to the use in the straight-type cylinder-injection four-cylindered gasoline engine, and may be also applied to single-cylinder engines, V-type six-cylinder engines, and various other engines that are different in the number of cylinders and in arrangement, and those engines which use other kinds of fuel (e.g., methanol) than gasoline.

Figure 4:
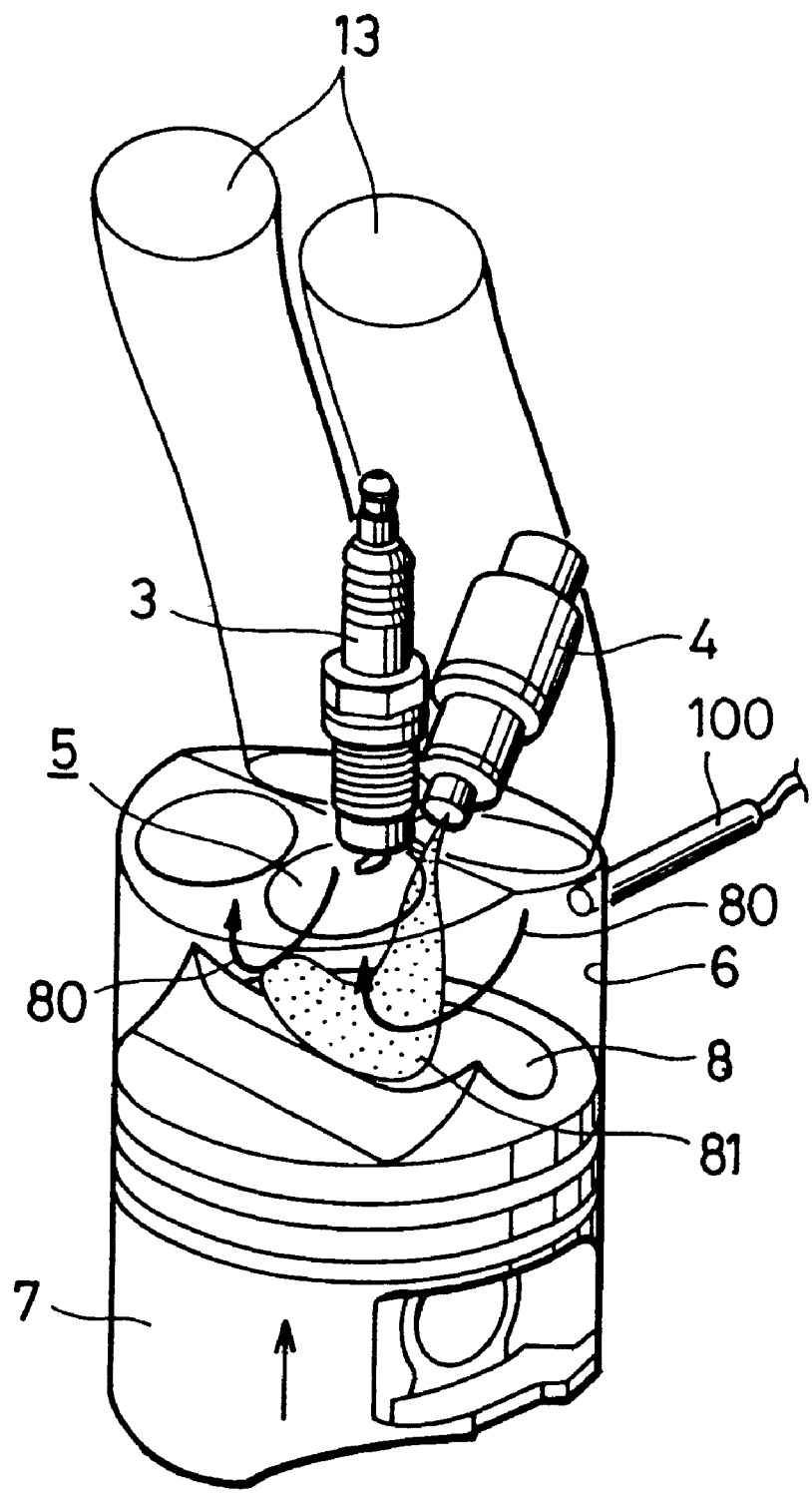
FIG. 4 is a view illustrating the way of fuel injection in a late injection mode.

If a temperature sensor (e.g., thermocouple) 100 is attached to the cylinder wall, as shown in FIG. 4, it can directly detect the wall temperature $T_{CW}$.

Whether or not the engine 1 is in the acceleration region can be also determined by the rate of change of the engine speed.

The specific arrangement and control procedure of the control system may be modified without departing from the scope or spirit of the invention. For example, the advance control time $t_x$ may be obtained from a map that uses the engine speed $N_E$ as a parameter. If the engine speed $N_E$ reaches a predetermined or higher speed, in this case, the advance control time $t_x$ may be set at a fixed value.

Also, the actual ignition timing may be advanced for a given period of time when the acceleration of the engine 1 is detected or estimated in an engine operation region such that the wall temperature $T_{CW}$ is lowered. In this case, the control system can be further simplified by setting the advance-side correction angle for the actual ignition timing at a fixed value.

What is claimed is:

1. An ignition timing control apparatus for a cylinder-injection internal combustion engine, said engine including a combustion chamber into which fuel is injected directly, and an ignition device for igniting said injected fuel, said ignition timing control apparatus comprising:

discriminating means for judging whether acceleration of a vehicle, in which said engine is installed, is being requested and discriminating an operation state of the engine;

determining means for determining an ignition timing for the ignition device in accordance with at least a load on the engine and an engine speed;

detecting means for detecting a wall temperature variable corresponding to one of a wall temperature of the combustion chamber and a parameter related to the wall temperature; and correcting means for correcting the determined ignition timing on an advance side in accordance with the wall temperature variable, for a given period of time immediately after said discriminating means judges that acceleration of said vehicle is being requested.

2. The apparatus according to claim 1, wherein said correcting means restrains or suspends the correction of the determined ignition timing on the advance side when it is concluded by said discriminating means that an engine operation state immediately before the transfer to the accelerative operation state is a high-load operation state.

3. The apparatus according to claim 1, wherein said discriminating means concludes that the engine operation state has changed to the accelerative operation state when an output control member of the engine is actuated on an acceleration side at a speed equal to or higher than a predetermined speed and an operation state of the engine, determined depending on the engine load and speed, represents a given acceleration region of the engine.

4. The apparatus according to claim 1, wherein said determining means sets a basic ignition timing which is suited to a steady operation state of the engine, wherein said correcting means includes storage means for storing at least one correction value in accordance with at least the load condition of the engine, and modifying means for modifying said at least one correction value, depending on the wall temperature variable detected by said detecting means, and wherein said correcting means reads said at least one correction value from the storage means in accordance with the engine load condition, modifies said at least one read correction value by means of the modifying means, and corrects the basic ignition timing in accordance with said at least one modified correction value.

5. The apparatus according to claim 4, wherein said correcting means suspends the correction of the basic ignition timing when the engine load condition changes during the correction, newly sets an advance-side correction value for the basic ignition timing in accordance with the latest engine load condition after the change, and corrects the basic ignition timing in accordance with said newly set value.

6. The apparatus according to claim 1, wherein said determining means determines an optimum ignition timing for obtaining a maximum engine output in accordance with at least the engine load and speed, and wherein said correcting means corrects the optimum ignition timing on the advance side in a state where the load of the engine is not lower than a predetermined load and the wall temperature variable detected by said detecting means is lower than that of a steady wall temperature, said steady wall temperature being obtained steadily when the load of the engine is not lower than said predetermined load.

7. The apparatus according to claim 6, wherein said correcting means corrects the optimum ignition timing on the advance side when it is concluded by said discriminating means that the engine operation state has changed to the accelerative operation state and is in a specific high-load operation region.

8. The apparatus according to claim 1, wherein said detecting means detects a manipulated variable of an output control member of the engine and the engine speed, and estimates the wall temperature variable in accordance with the detected manipulated variable and engine speed.

9. The apparatus according to claim 1, wherein said detecting means detects a temperature of cooling water of the engine when the engine is started, and estimates the wall temperature variable in accordance with the detected cooling water temperature.

10. The apparatus according to claim 1, wherein said discriminating means selects at least one predetermined engine operation region in accordance with the engine speed and load, said detecting means detects, as the wall temperature variable, a period of duration for which the engine is kept in the selected operation region, and said correcting means corrects the ignition timing on the advance side in accordance with the detected period of duration.

11. The apparatus according to claim 10, wherein said at least one predetermined engine operation region includes a specific high-load engine operation region.

12. The apparatus according to claim 10, wherein said correcting means includes storage means for storing at least one advance-side correction value for the ignition timing, the advance-side correction value being set in accordance with at least the load of the engine, and learning means for setting a learning correction value for the advance-side correction value in accordance with the detected period of duration, the learning correction value serving to determine a degree of reflection of said at least one advance-side correction value on the ignition timing, and wherein said correcting means reads said at least one advance-side correction value corresponding to the engine load from the storage means and corrects the ignition timing on the advance side in accordance with said at least one read correction value and said learning correction value.

13. The apparatus according to claim 12, wherein said at least one predetermined engine operation region includes a high-load engine operation region, and said learning means changes the learning correction value at a predetermined decreasing speed in a direction such that the degree of reflection of said at least one advance-side correction value is decreased when the engine is in the high-load operation region, and changes the learning correction value at a predetermined increasing speed in a direction such that the degree of reflection of said at least one advance-side correction value is increased when the engine is in any other region than the high-load operation region.

14. The apparatus according to claim 13, wherein the decreasing speed of said learning correction value is higher than the increasing speed of the learning correction value.

15. The apparatus according to claim 1, wherein said detecting means includes a temperature sensor for directly detecting a wall temperature of the combustion chamber as the wall temperature variable.

16. An ignition timing control apparatus for a cylinder-injection internal combustion engine, said engine including a combustion chamber into which a fuel is injected directly, and an ignition device for igniting said injected fuel, and said ignition timing control apparatus comprising:

setting means for setting an optimum ignition timing corresponding to a steady wall temperature of the combustion chamber, said steady wall temperature being obtained steadily for each of predetermined engine load conditions:

discriminating means for discriminating a load condition of the engine; and correcting means for correcting the optimum ignition timing on an advance side for a given period of time when a sudden increase of the engine load is discriminated by said discriminating means.

17. A method for controlling an ignition timing of a cylinder-injection internal combustion engine, said engine including a combustion chamber into which fuel is injected directly, and an ignition device for igniting said injected fuel, said method comprising:

judging whether acceleration of a vehicle, in which said engine is installed, is being requested;

discriminating an operation state of the engine;

determining an ignition timing in accordance with at least a load on the engine and an engine speed;

detecting a wall temperature variable corresponding to one of a wall temperature of the combustion chamber and a parameter related to the wall temperature; and correcting the ignition timing on an advance side in accordance with the wall temperature variable for a given period of time immediately after said judging step judges that acceleration of said vehicle is being requested.

18. The method according to claim 17, wherein said correction of the ignition timing on the advance side is restrained or suspended when an engine operation state immediately before the transfer to the accelerative operation state is a high-load operation state.

19. The method according to claim 17, wherein said discriminating step includes that the engine operation has changed to the accelerative operation state when an output control member of the engine is actuated on an acceleration side at a speed equal or higher than a predetermined speed and an operation state of the engine, determined depending on the engine load and speed, represents a given acceleration region of the engine.

20. The method according to claim 17, wherein said determining step sets a basic ignition timing suited to a steady operation state of the engine, and said correcting step includes sub-steps of: reading at least one advance-side correction value from storage means, the storage means storing said at least one advance-side correction value in accordance with at least the load condition of the engine; modifying said at least one advance-side correction value, depending on the wall temperature variable; and correcting the basic ignition timing in accordance with said at least one modified correction value.

21. The method according to claim 20, wherein said correcting step further includes sub-steps of: suspending the correction of the basic ignition timing when the engine load condition changes during correction, newly setting a correction value for the basic ignition timing in accordance with the latest engine load condition after the change; and correcting the basic ignition timing on the advance side in accordance with said newly set correction values.

22. The method according to claim 17, wherein said determining step determines an optimum ignition timing for obtaining a maximum engine output in accordance with at least the engine load and speed, and said correcting step corrects said optimum ignition timing on the advance side in a state where the load of the engine is not lower than a predetermined load and the detected wall temperature variable is lower than that a steady wall temperature variable, said steady wall temperature being obtained steadily when the load of the engine is not lower than said predetermined load.

23. The method according to claim 22, wherein said correcting step corrects said optimum ignition timing on the advance side when said discriminating step discriminates that the engine operation state has changed to the accelerative operation state and is in a specific high-load operation region.

24. The method according to claim 17, wherein said detecting step estimates said wall temperature variable in accordance with the manipulated variable of an output control member of the engine and the engine speed.

25. The method according to claim 17, wherein said detecting step estimates said wall temperature variable in accordance with a temperature of cooling water of the engine when the engine is started.

26. The method according to claim 17, wherein said discriminating step includes a sub-step of selecting at least one of predetermined engine operation region in accordance with the engine speed and load, said detecting step detects, as the wall temperature variable, a period of duration for which the engine is kept in the selected operation region, and said correcting step corrects the ignition timing on the advance side in accordance with the detected period of duration.

27. The method according to claim 26, wherein said at least one predetermined operation region includes a specific high-load engine operation region.

28. The method according to claim 26, wherein said correcting step includes sub-steps of: reading at least one advance-side correction value for the ignition timing from storage means, the storage means storing said at least one advance-side correction value in accordance with at least the load condition of the engine; and setting a learning correction value for the at least one advance-side correction value in accordance with the detected period of duration, the learning correction value serving to determine a degree of reflection of the at least one advance-side correction value on the ignition timing; said correcting step corrects the ignition timing on the advance side in accordance with the at least one advance-side correction value read from the storage means and the set learning correction value.

29. The method according to claim 28, wherein said at least one predetermined operation region includes a high-load engine operation region, and said learning correction value is changed at a predetermined decreasing speed in a direction such that the degree of reflection of at least one advance-side correction value is decreased when the engine is in the high-load engine operation region, and is changed at a predetermined increasing speed in a direction such that the degree of reflection of the at least one advance-side correction value is increased when the engine is in any other region than the high-load engine operation region.

30. The method according to claim 29, wherein the decreasing speed of said learning correction value is higher than the increasing speed of the learning correction value.

31. The method according to claim 17, wherein said wall temperature variable represents a wall temperature of the combustion chamber detected directly by means of a temperature sensor.

32. An ignition timing control method for a cylinder-injection internal combustion engine, said engine including a combustion chamber into which fuel is injected directly, and an ignition device for igniting the injected fuel, said ignition timing control method comprising:

setting an optimum ignition timing corresponding to a steady wall temperature of the combustion chamber, said steady wall temperature being obtained steadily for each of predetermined engine load conditions;

discriminating a load condition of the engine; and correcting the optimum ignition timing on an advance side for a given period of time when a sudden increase of the engine load is discriminated in said discriminating step.

33. An ignition timing control apparatus for a cylinder-injection internal combustion engine, said engine including a combustion chamber into which fuel is injected directly, and an ignition device for igniting said injected fuel, said ignition timing control apparatus comprising:

discriminating means for discriminating an operation state of the engine;

determining means for determining an ignition timing for the ignition device in accordance with at least a load on the engine and an engine speed;

detecting means for detecting a wall temperature variable corresponding to one of a wall temperature of the combustion chamber and a parameter related to the wall temperature;

advance control time calculating means for calculating a period of time, from a start of an accelerative operation of the engine, in which the determined ignition timing is corrected, based on a throttle opening degree; and correcting means for correcting the determined ignition timing on an advance side in accordance with the wall temperature variable, for said calculated period of time when it is concluded by said discriminating means that the engine operation state has changed to an accelerative operation state.

* * * * *